(12) United States Patent
Schechter et al.

(10) Patent No.: US 11,233,247 B2
(45) Date of Patent: Jan. 25, 2022

(54) TIN-BASED CATALYSTS, THE PREPARATION THEREOF, AND FUEL CELLS USING THE SAME

(71) Applicant: ARIEL SCIENTIFIC INNOVATIONS LTD., Ariel (IL)

(72) Inventors: Alex Schechter, Givat Koach (IL); Hanan Teller, Revava (IL); Diwakar Kashyap, Ariel (IL)

(73) Assignee: ARIEL SCIENTIFIC INNOVATIONS LTD., Ariel (IL)

( * ) Notice: Subject to any disclaimer, the term of this patent is extended or adjusted under 35 U.S.C. 154(b) by 13 days.

(21) Appl. No.: 16/327,951

(22) PCT Filed: Aug. 27, 2017

(86) PCT No.: PCT/IL2017/050950
§ 371 (c)(1),
(2) Date: Feb. 25, 2019

(87) PCT Pub. No.: WO2018/037419
PCT Pub. Date: Mar. 1, 2018

(65) Prior Publication Data
US 2019/0207228 A1 Jul. 4, 2019

Related U.S. Application Data

(60) Provisional application No. 62/379,813, filed on Aug. 26, 2016.

(51) Int. Cl.
*H01M 4/92* (2006.01)
*H01M 4/88* (2006.01)
(Continued)

(52) U.S. Cl.
CPC ............... *H01M 4/926* (2013.01); *C22C 5/04* (2013.01); *H01M 4/8853* (2013.01);
(Continued)

(58) Field of Classification Search
CPC .... H01M 4/96; H01M 4/8853; H01M 4/9041; H01M 4/9083; C22C 5/04
(Continued)

(56) References Cited

U.S. PATENT DOCUMENTS 4,066,809 A 1/1978 Alpaugh et al.
4,830,844 A 5/1989 Kolts
(Continued)

FOREIGN PATENT DOCUMENTS

CN 101516550 A 8/2009
CN 101664685 A 3/2010
(Continued)

OTHER PUBLICATIONS

Ding et al. Hierarchical Pd—Sn Alloy Nanosheet Dendrites: An Economical and Highly Active Catalyst for Ethanol Electrooxidation, Scientific Reports, 2013, 1181, https://doi.org/10.1038/srep01181 (Year: 2013).*
(Continued)

*Primary Examiner* — Sean P Cullen
(74) *Attorney, Agent, or Firm* — The Roy Gross Law Firm, LLC; Roy Gross

(57) ABSTRACT

A composition comprised of a tin (Sn) or lead (Pb) film, wherein the film is coated by a shell, wherein the shell: (a) is comprised of an active metal, and (b) is characterized by a thickness of less than 50 nm, is discloses herein. Further disclosed herein is the use of the composition for the oxidation of e.g., methanol, ethanol, formic acid, formaldehyde, dimethyl ether, methyl formate, and glucose.

16 Claims, 31 Drawing Sheets
(2 of 31 Drawing Sheet(s) Filed in Color)

(51) Int. Cl.
*H01M 4/90* (2006.01)
*C22C 5/04* (2006.01)

(52) U.S. Cl.
CPC ....... *H01M 4/9041* (2013.01); *H01M 4/9083* (2013.01); *H01M 4/921* (2013.01)

(58) Field of Classification Search
USPC .................................. 429/523, 524, 525, 532
See application file for complete search history.

(56) References Cited

U.S. PATENT DOCUMENTS

| | | | |
|---|---|---|---|
| 5,189,006 | A | 2/1993 | Augustine et al. |
| 5,922,487 | A | 7/1999 | Watanabe et al. |
| 2007/0231674 | A1* | 10/2007 | Shelnutt ................ H01M 4/925 429/483 |
| 2007/0269705 | A1 | 11/2007 | Alexandrovichserov et al. |
| 2008/0102350 | A1 | 5/2008 | Osaka et al. |
| 2009/0297913 | A1 | 12/2009 | Zhang et al. |
| 2010/0086832 | A1* | 4/2010 | Lopez .................. H01M 4/926 429/409 |
| 2010/0216632 | A1 | 8/2010 | Radoslav et al. |
| 2011/0086295 | A1 | 4/2011 | Marco et al. |
| 2013/0260255 | A1 | 10/2013 | Lopatin et al. |
| 2015/0333338 | A1* | 11/2015 | Hayden .................. C01G 23/07 429/524 |
| 2016/0079607 | A1* | 3/2016 | Kaneko ............... H01M 4/8657 429/465 |
| 2016/0214915 | A1 | 7/2016 | Weiner et al. |

FOREIGN PATENT DOCUMENTS

| | | | | |
|---|---|---|---|---|
| CN | 102500365 | A | | 6/2012 |
| CN | 103657629 | A | | 3/2014 |
| CN | 103887530 | A | * | 6/2014 |
| CN | 103887529 | B | | 9/2016 |
| EP | 2407521 | A1 | | 1/2012 |
| JP | 2015056286 | A | * | 3/2015 ............. C01G 19/02 |
| WO | 2008080227 | A1 | | 7/2008 |

OTHER PUBLICATIONS

Santos et al., Síntese De Catalisadores Pt@ Sb/C Para O Oxidação Eletroquimica De Metanol Em Meio Ácido, 2015, Blucher Chemical Engineering Proceedings, 1.2, 13785-13792 (Year: 2015).*

Krichevski, et al., "The Synthesis of Metallic β-Sn Nanostructures for Use as a Novel Pt Catalyst Support and Evaluation of Their Activity Toward Methanol Electrooxidation", Electrocatalysis, 6(6), 554-562 (2015).

Li, et al., "Enhanced stability of Pt nanoparticle electrocatalysts for fuel cells", Nano Research, 8(2), 418-440 (2015).

International Search Report of PCT/IL2017/050950 Completed Dec. 17, 2017; dated Dec. 19, 2017 3 pages.

Written Opinion of PCT/IL2017/050950 Completed Dec. 17, 2017; dated Dec. 19, 2017 5 pages.

Olga Krichevski et al. "The Synthesis of Metallic B—Sn Nanostructures for Use as a Novel Pt Catalyst Support and Evaluation of Their Activity Toward Methanol Electrooxidation" 554-562, Aug. 27, 2015.

Bokai Liaoa et al. "Effect of citrate ions on the electrochemical migration of tin in thinelectrolyte layer containing chloride ions" (112) 393-401, Aug. 8, 2016.

Kazuhiro Fukami et al. "General Mechanism for the Synchronization of Electrochemical Oscillations and Self-Organized Dendrite Electrodeposition of Metals with Ordered 2D and 3D Microstructures" J. Phys. Chem. C, (111), 1150-1160, Dec. 15, 2006.

Jeong-Hoon Jeun et al. "Electrophoretic deposition of carbon nanoparticles on dendritic Sn foams fabricated by electrodeposition", Materials Letters, (112) 109-112, Sep. 7, 2013.

Hanan Teller et al. "Morphological study of branched Sn structure formed under selected electrochemical conditions", J Mater Sci, (51) 8471-8483. Jun. 6, 2016.

* cited by examiner

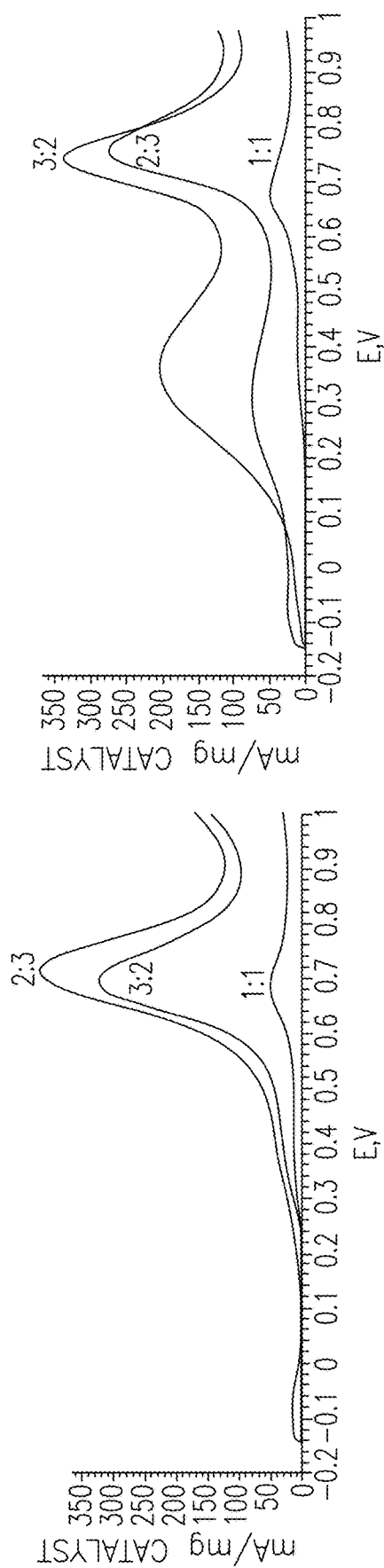
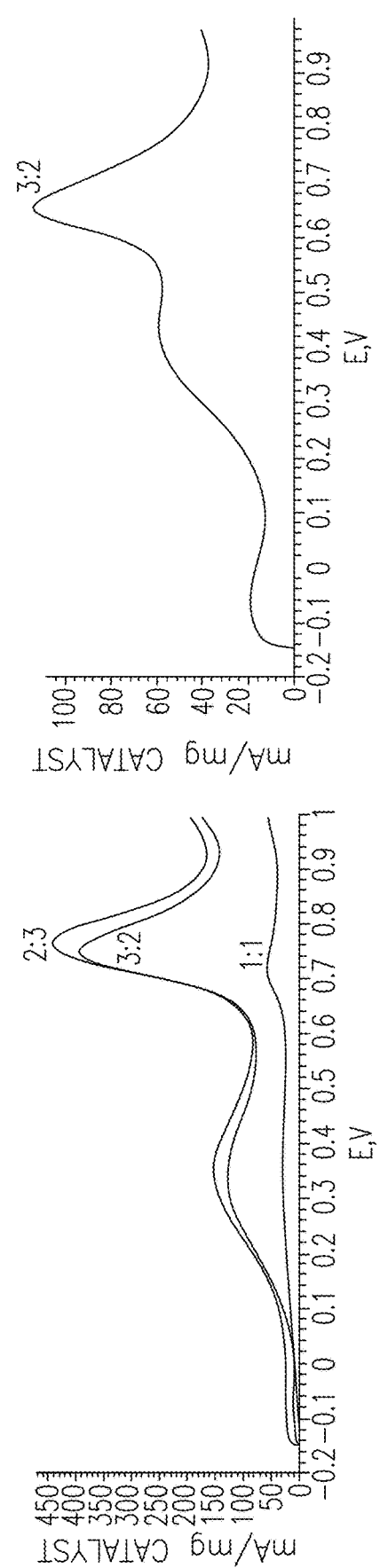
FIG.21A  FIG.21B  FIG.21C  FIG.21D

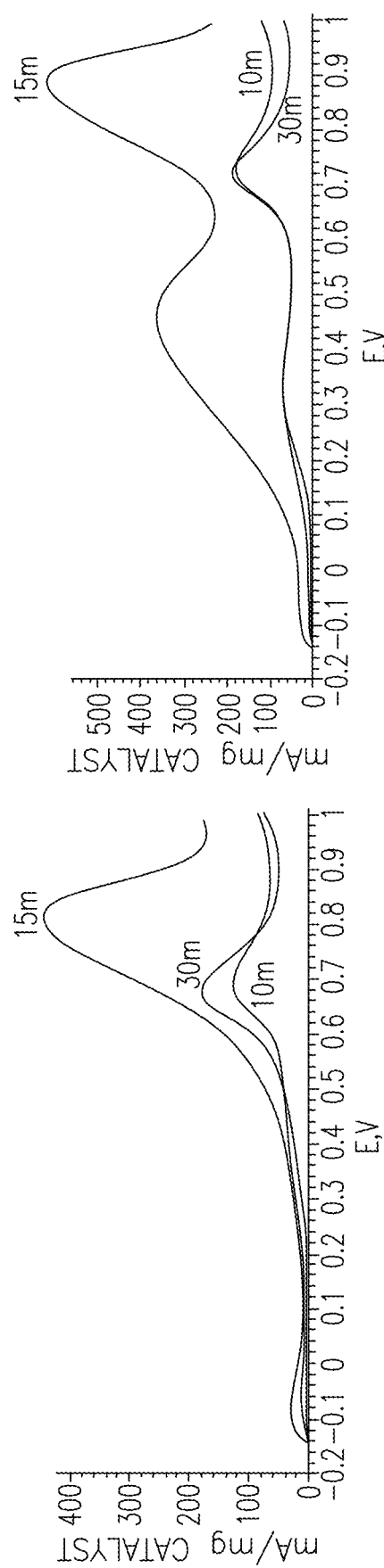
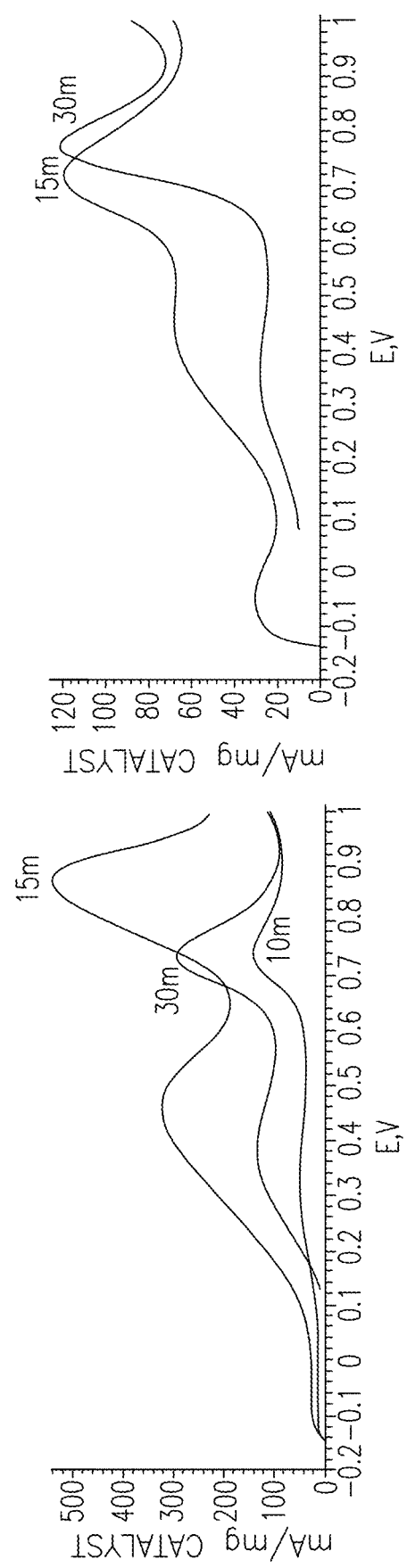
FIG.22A  FIG.22B  FIG.22C  FIG.22D

TIN-BASED CATALYSTS, THE PREPARATION THEREOF, AND FUEL CELLS USING THE SAME

CROSS-REFERENCE TO RELATED APPLICATIONS

This application is a National Phase of PCT Patent Application No. PCT/IL2017/050950 titled "TIN-BASED CATALYSTS, THE PREPARATION THEREOF, AND FUEL CELLS USING THE SAME" having International filing date of Aug. 27, 2017, which claims the benefit of priority from U.S. Provisional Patent Application No. 62/379,813, filed on Aug. 26, 2016. The contents of the above applications are all incorporated by reference as if fully set forth herein in their entirety.

FIELD OF INVENTION

The present invention, in some embodiments thereof, relates to platinum-tin based catalysts.

BACKGROUND OF THE INVENTION

A fuel cell converts chemical energy directly into electric energy by supplying a fuel and an oxidant to two electrically-connected electrodes and thus causing electrochemical oxidation of the fuel.

Noble metal catalysts such as a platinum catalyst and a platinum alloy catalyst have been used as the catalyst of the anode and cathode electrodes of a fuel cell. However, noble metal catalysts are scarce resources and it is expensive to use them for large-scale commercial production of fuel cells.

In noble metal catalyst particles, catalytic reaction occurs on the surface of the particles only and the inside of the particles seldom participates in catalytic reaction. Therefore, the catalytic activity per unit mass of a noble metal catalyst particle is not always high.

Catalyst particles having a structure such that a core particle is covered with an outermost layer, that is, a so-called core-shell structure, can increase the catalytic activity per unit mass of a noble metal catalyst. Catalyst particles having a core-shell structure can secure catalytic activity and cost reduction by using a material with excellent catalytic activity as the outermost layer together with inexpensive material which does not directly participate in catalytic reaction as the core particle.

SUMMARY OF THE INVENTION

According to an aspect of some embodiments of the present invention, there is provided a composition comprising film comprising an element selected from the group consisting of: tin (Sn), lead (Pb), or a combination thereof, wherein the Sn film is coated by a shell, wherein the shell: (a) comprises an active metal, and (b) is characterized by a thickness of less than 50 nm. In some embodiments, the thickness is in the range of 2 nm to 10 nm.

In some embodiments, the active metal is selected from the group consisting of: platinum (Pt), palladium (Pd), or an alloy thereof.

In some embodiments, the shell further comprises a material selected from the group consisting of Sn, ruthenium (Ru), selenium (Se), or any combination thereof.

According to an aspect of some embodiments of the present invention, there is provided a composition comprising a film comprising an element selected from the group consisting of: tin (Sn), lead (Pb), or a combination thereof, a material comprising one or more active metal nanoparticles (NPs), and a substrate, wherein the film is: (a) deposited on at least one surface of the substrate, and (b) coated by the material comprising the one or more active metal NPs.

In some embodiments, a plurality of the nanoparticles forms a shell on the Sn film, the shell being characterized by a thickness of less than 10 nm.

In some embodiments, the Sn film is in the form of dendritic structure having a stem and branches.

In some embodiments, the stem and branches are characterized by a ratio of 1:1 to 5:1, respectively.

According to an aspect of some embodiments of the present invention, there is provided a fuel cell having an electrocatalyst comprising the disclosed composition in an embodiment thereof.

In some embodiments, the electrocatalyst is anode.

In some embodiments, the electrocatalyst is characterized by an electrochemically active surface area of at least 75 $m^2g^{-1}$.

According to an aspect of some embodiments of the present invention, there is provided a process for manufacturing a catalyst comprising a substrate having attached thereon an Sn or Pb film, wherein: (a) the film is coated by one or more active metal NPs and optionally an element selected from the group consisting of Sn, ruthenium (Ru), selenium (Se), or any combination thereof, and (b) the substrate comprises one or more materials selected from carbon (e.g., carbon black), a metal oxide, a polymer, or any combination thereof, the process comprising the steps of: (i) electrodepositing the Sn film on the substrate; and (ii) plating a material comprising the active metal NPs and optionally the M on the Sn film, thereby obtaining the catalyst.

In some embodiments, step (ii) is performed by electroplating or electroless plating.

According to an aspect of some embodiments of the present invention, there is provided a use of the disclosed composition, for the oxidation of a material selected from methanol, ethanol, formic acid, formaldehyde, dimethyl ether, methyl formate, and glucose.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1A:
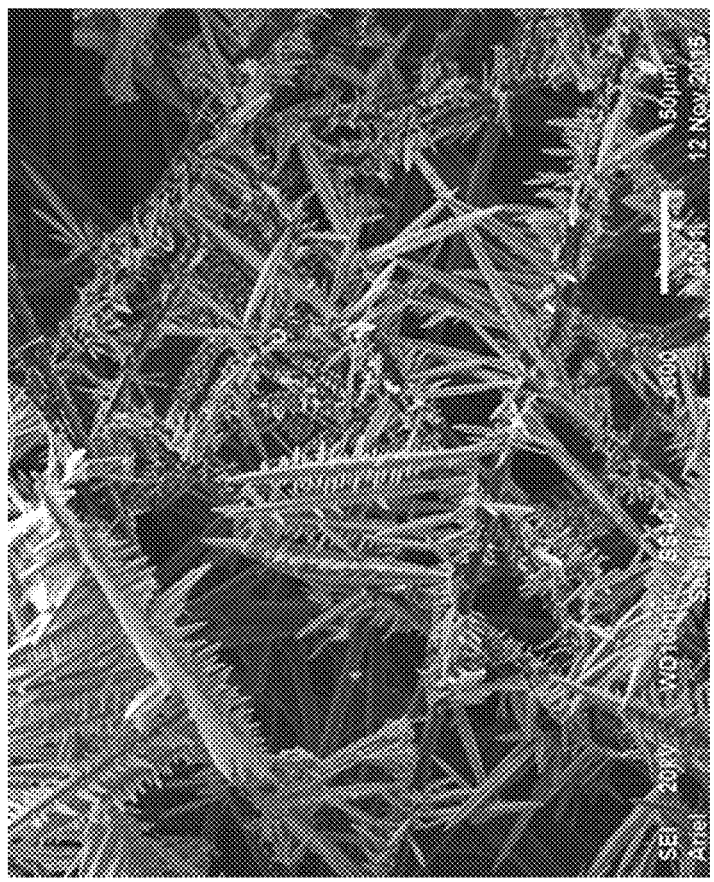
Figure 1B:
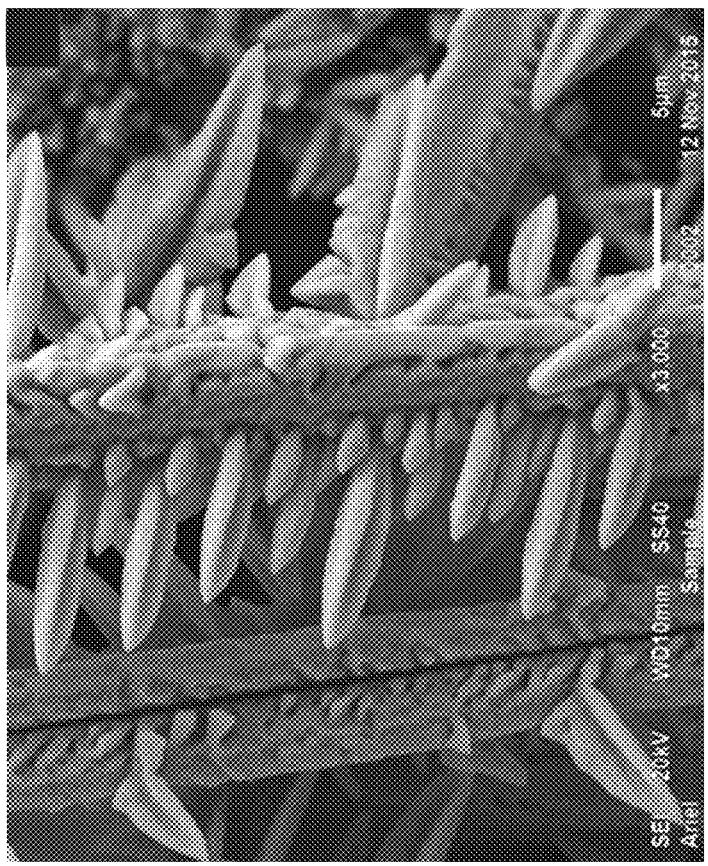
Figure 2A:
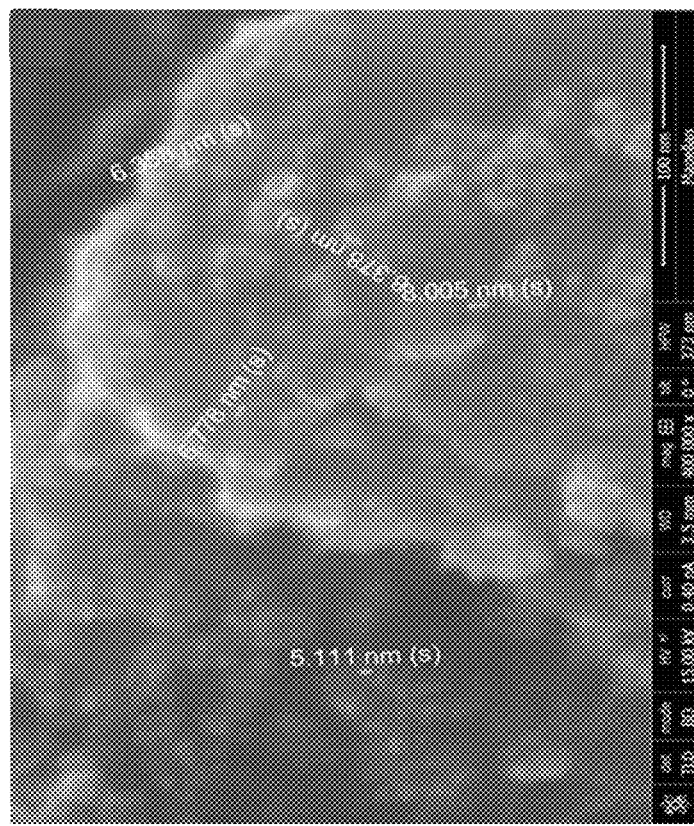
Figure 2B:
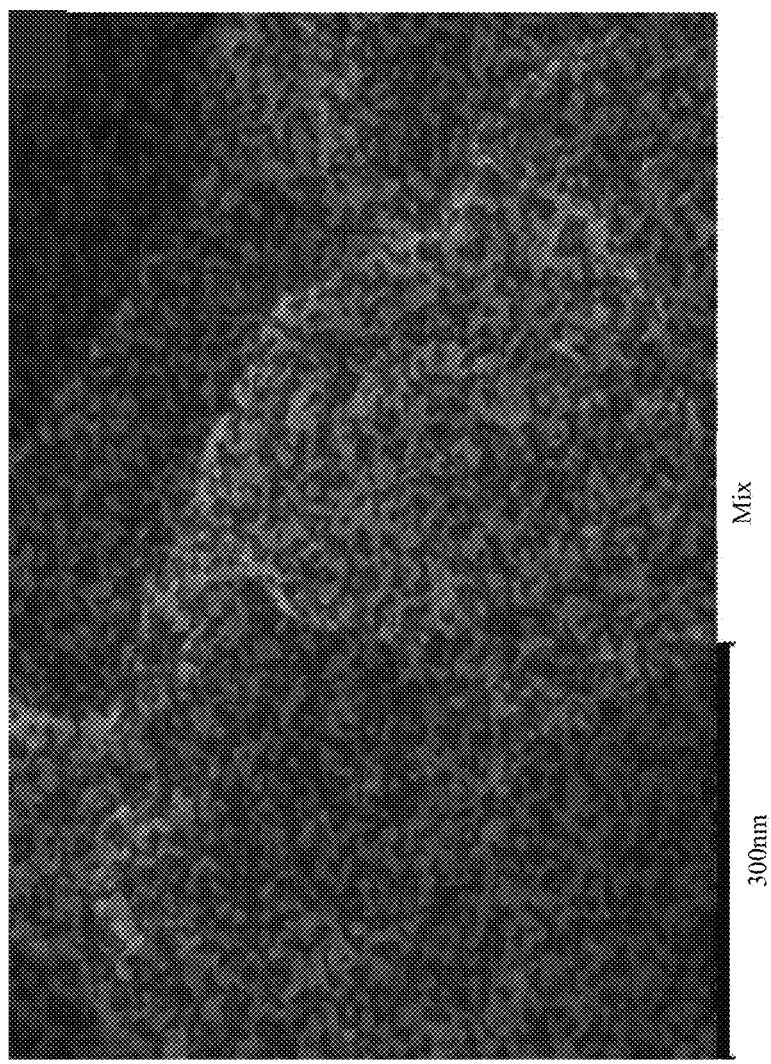
Figure 3A:
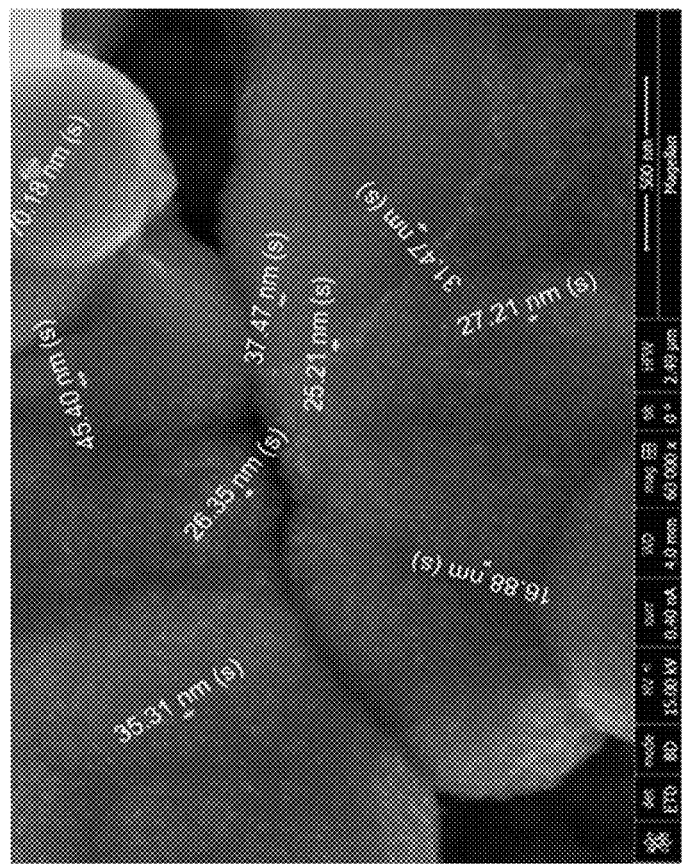
Figure 3B:
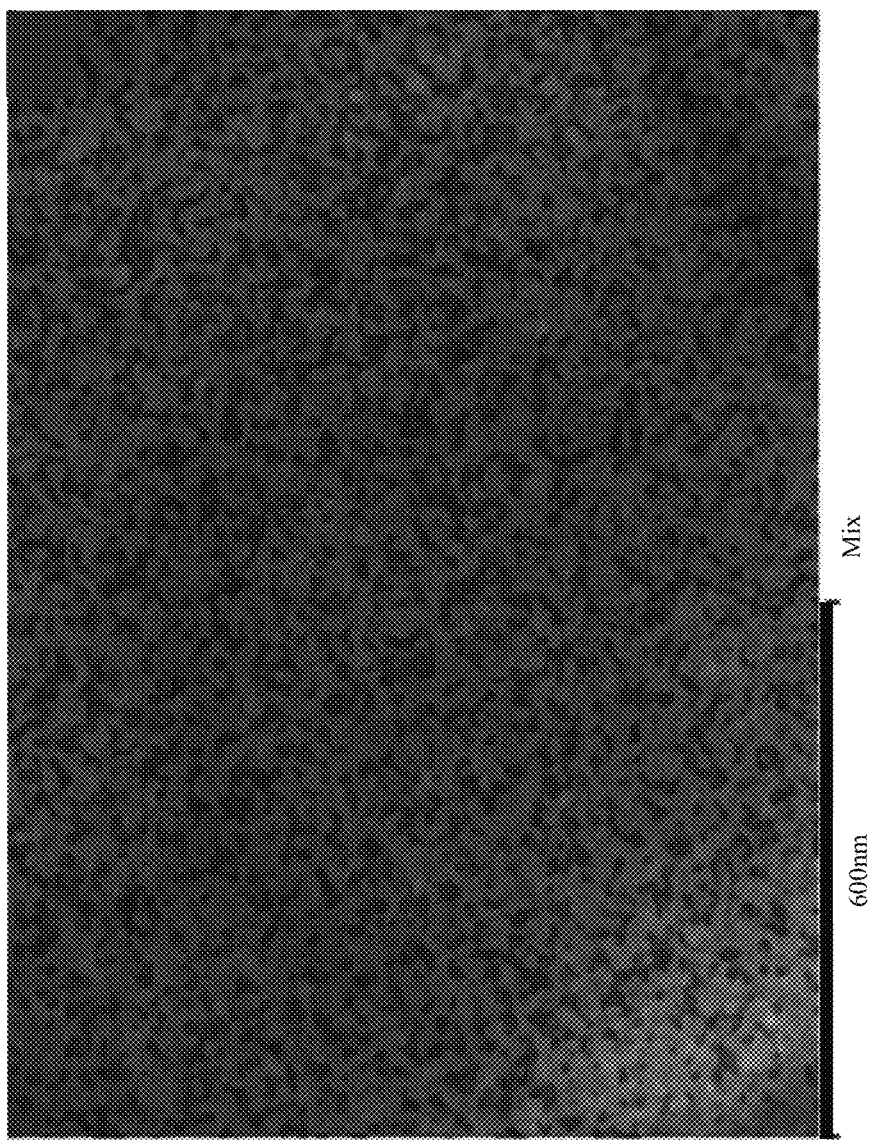
Figure 4:
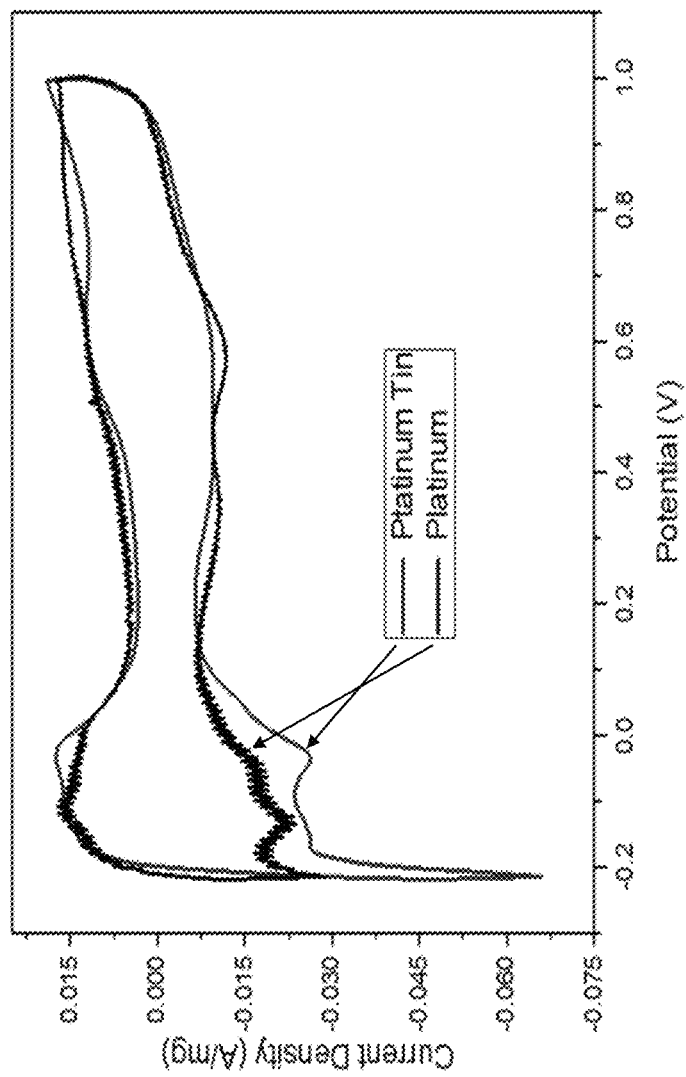

FIGS. 1A-B present scanning electron microscopic (SEM) image of tin dendrites formed by electrodeposition at different magnification (FIG. 1A) 50 μm and 5 μm (FIG. 1B);

FIGS. 2A-B present high resolution (HR) SEM image of PtSn@Sn catalyst (FIG. 2A; bar is 100 nm; numbers in the image depict the size of the particles as described below) and energy-dispersive X-ray spectroscopy (EDX) of Pt@Sn catalyst (Red: Platinum, Blue: Sn, Green: Oxygen; FIG. 2B, bar is 300 nm);

FIGS. 3A-B present HRSEM image of Pt@Sn catalyst (FIG. 3A, bar is 500 nm; numbers in the image depict the size of the particle as described below), and EDX of PtSn@Sn catalyst (Red: Platinum, Blue: Sn, Green: Oxygen; FIG. 3B);

FIG. 4 presents cyclic voltammetry of electrodes in supporting electrolyte (0.5M $H_2SO_4$).

Figure 5:
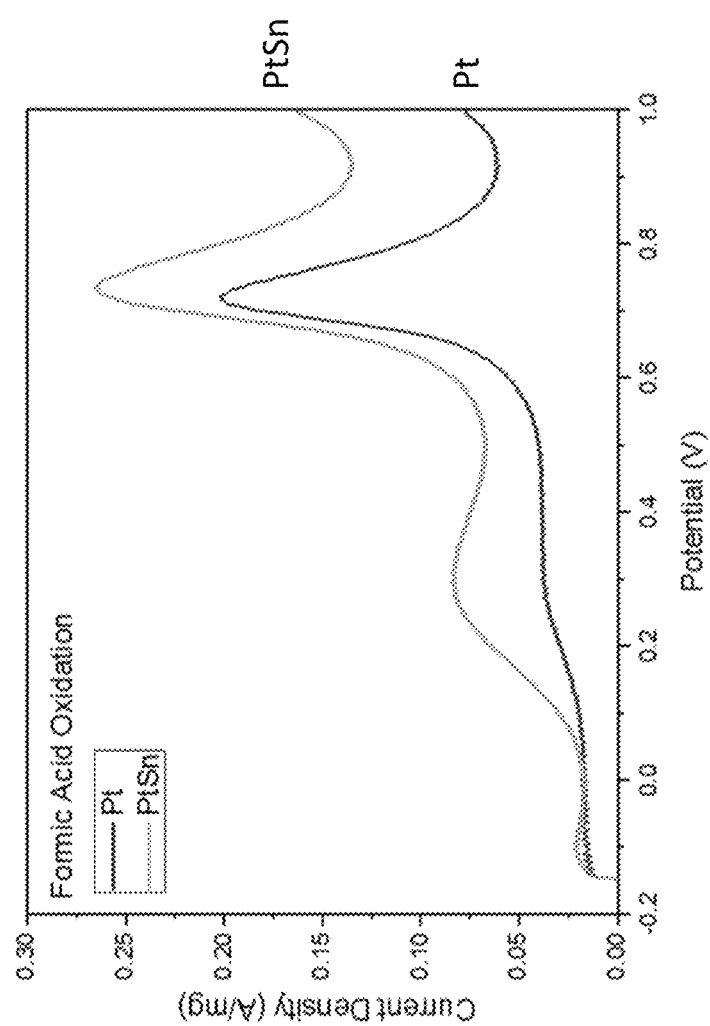
Figure 6:
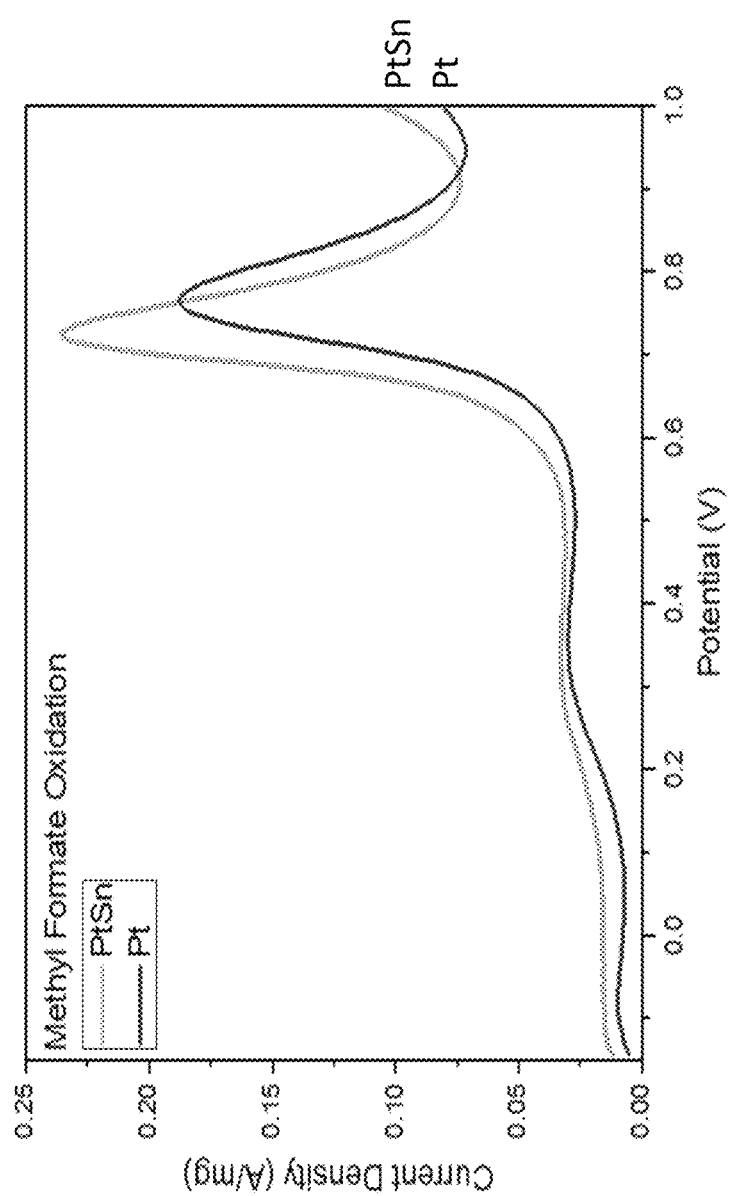
Figure 7:
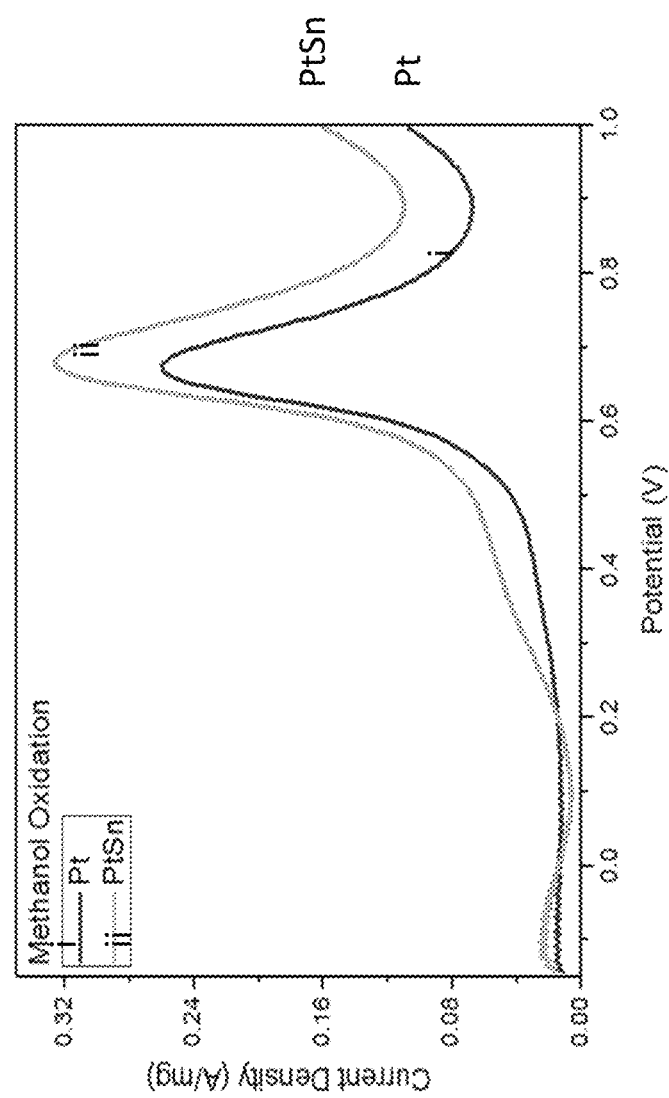
Figure 8B:
Figure 8A:
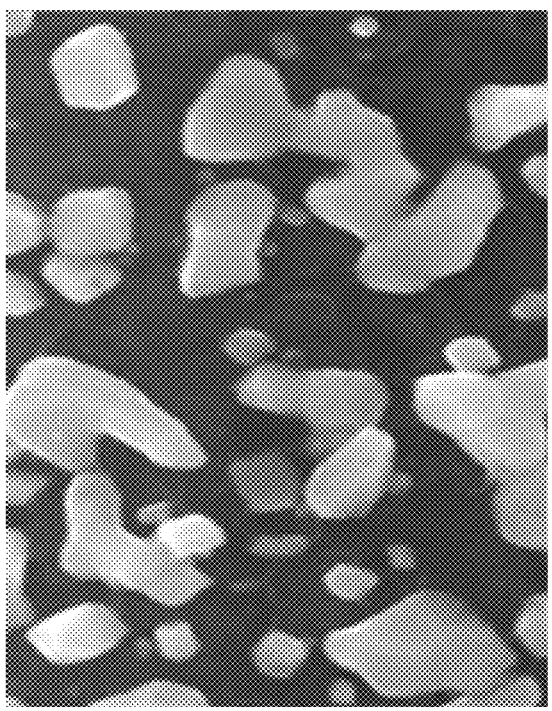
Figures 8C, 8D:
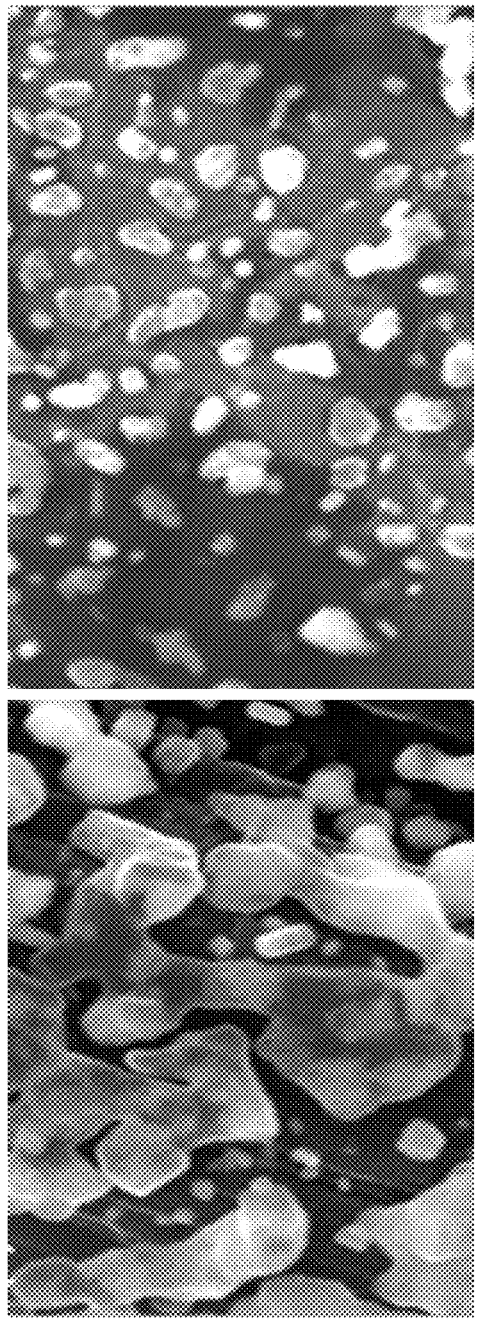
Figure 9C:
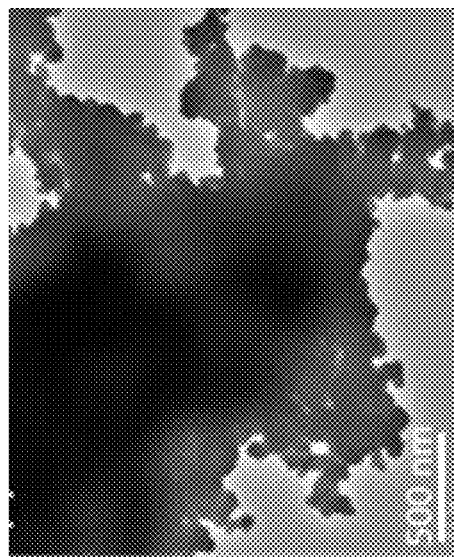
Figure 9B:
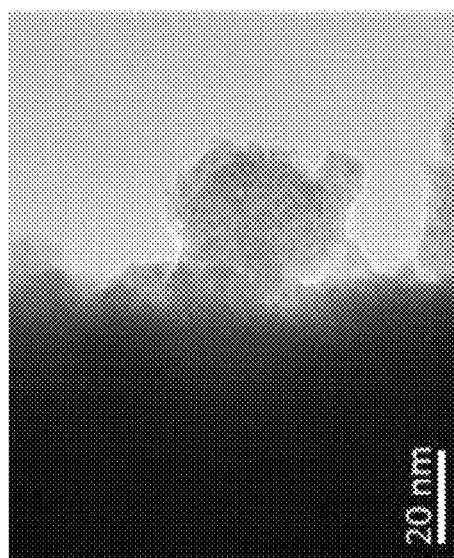
Figure 9A:
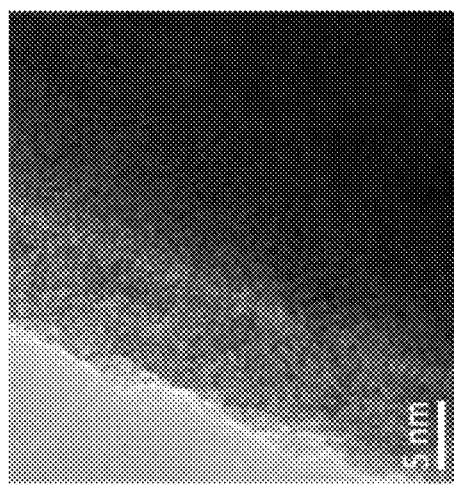
Figure 10:
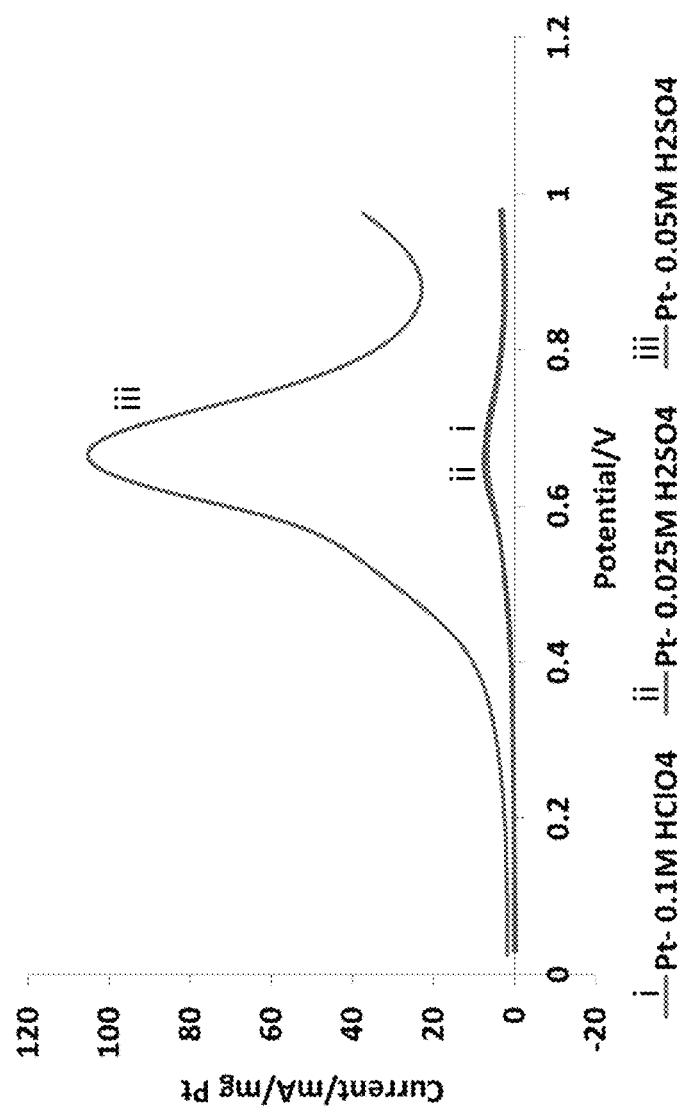
Figure 11:
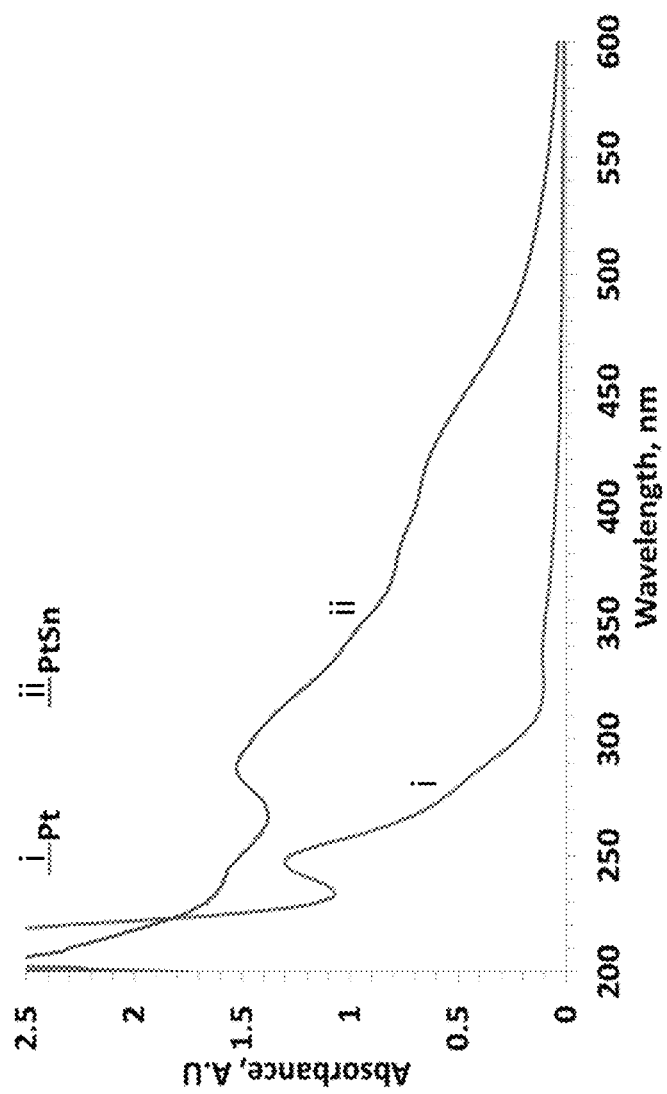
Figure 12:
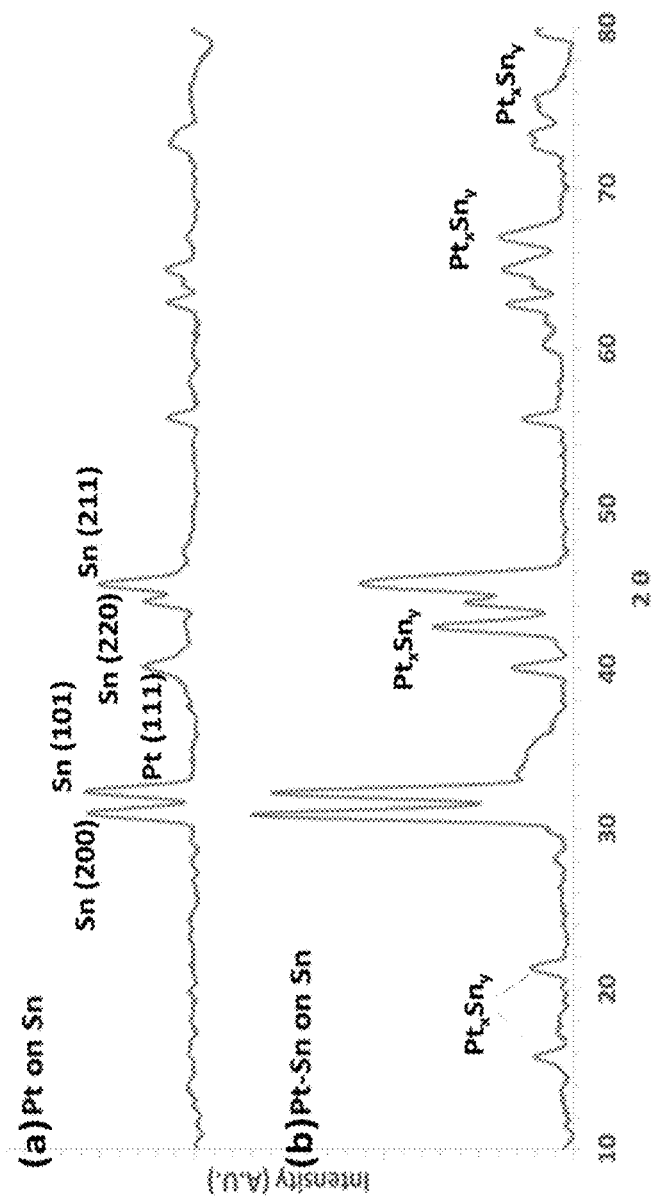
Figure 13A:
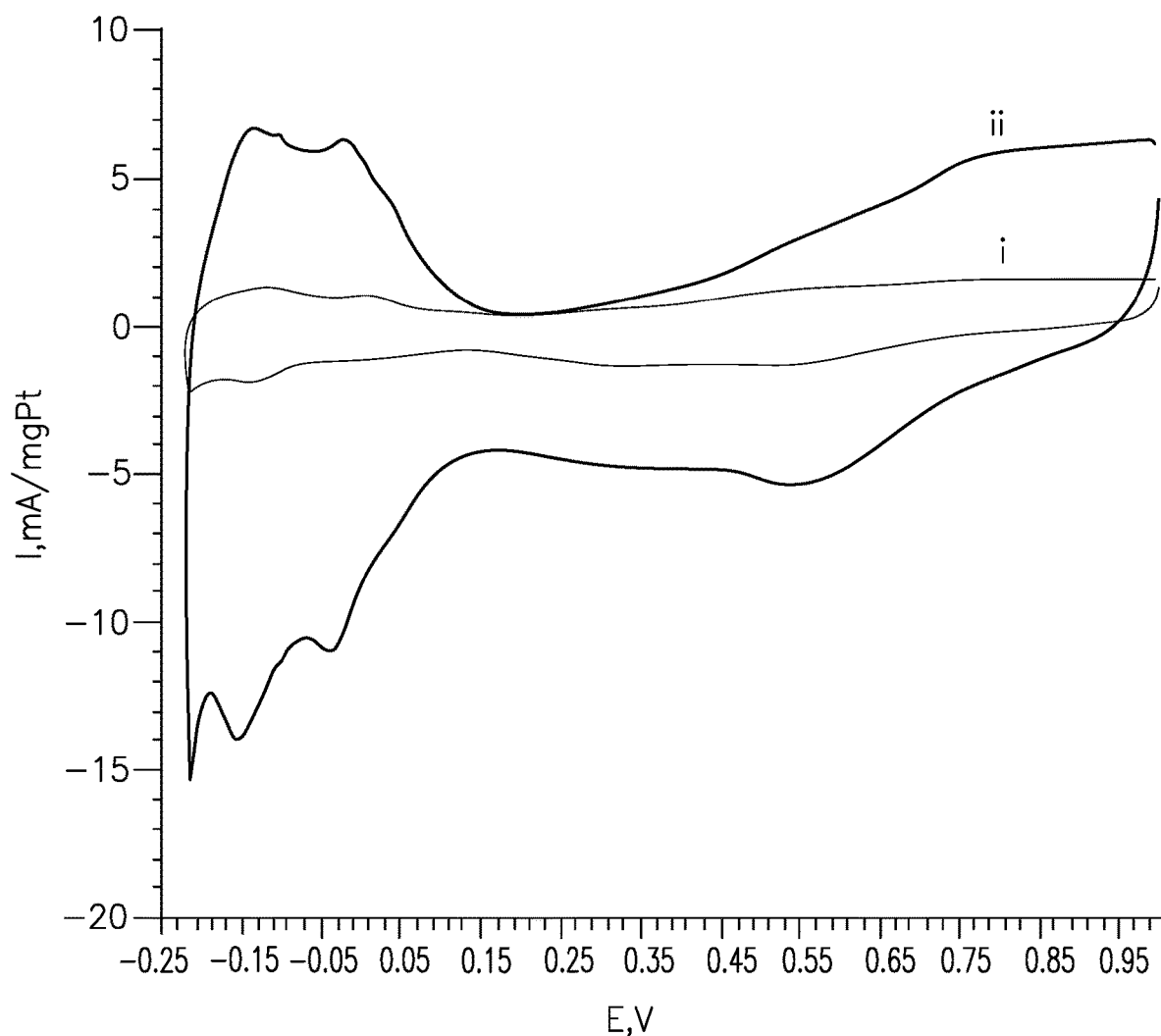
Figure 13B:
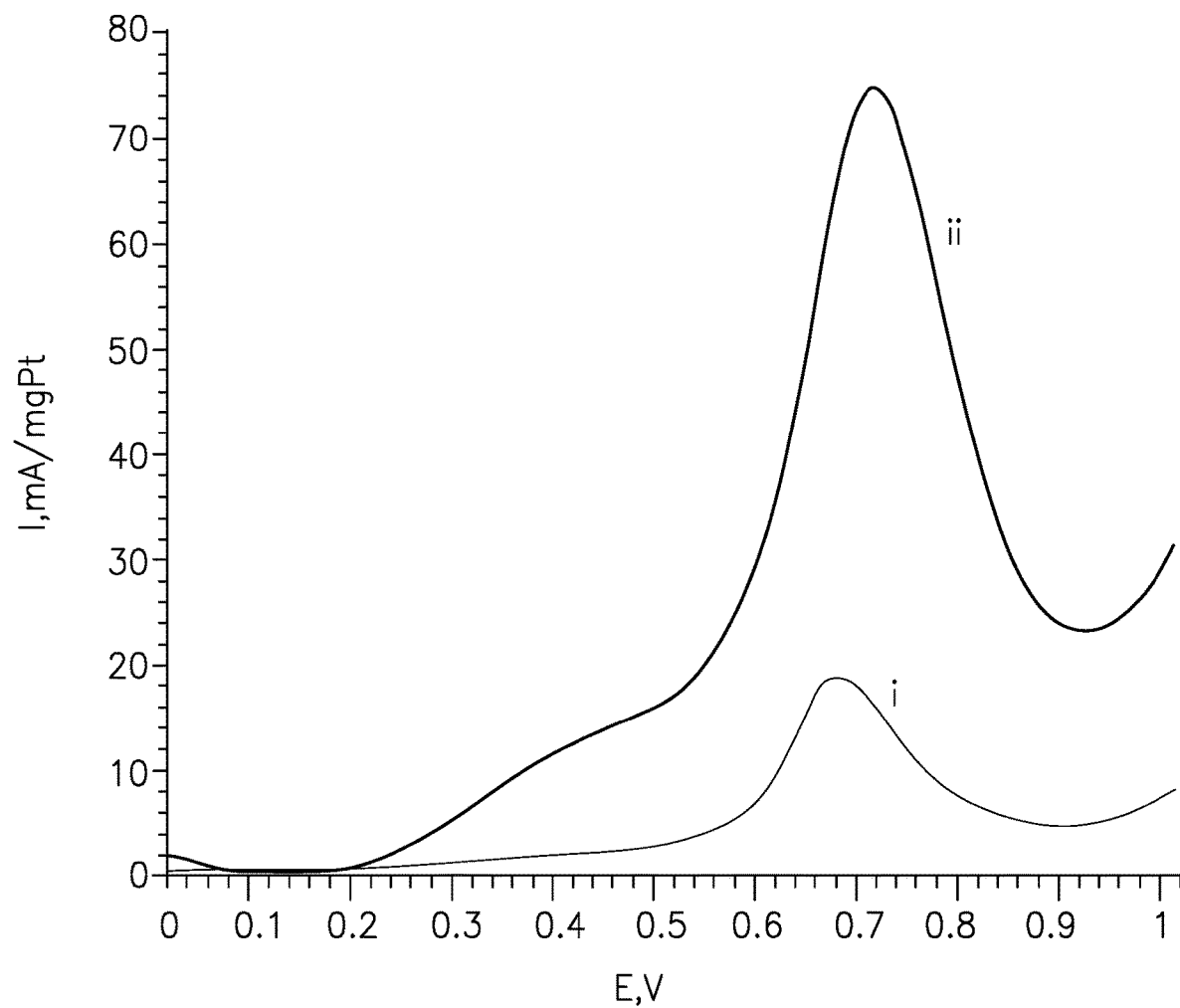
Figure 14A:
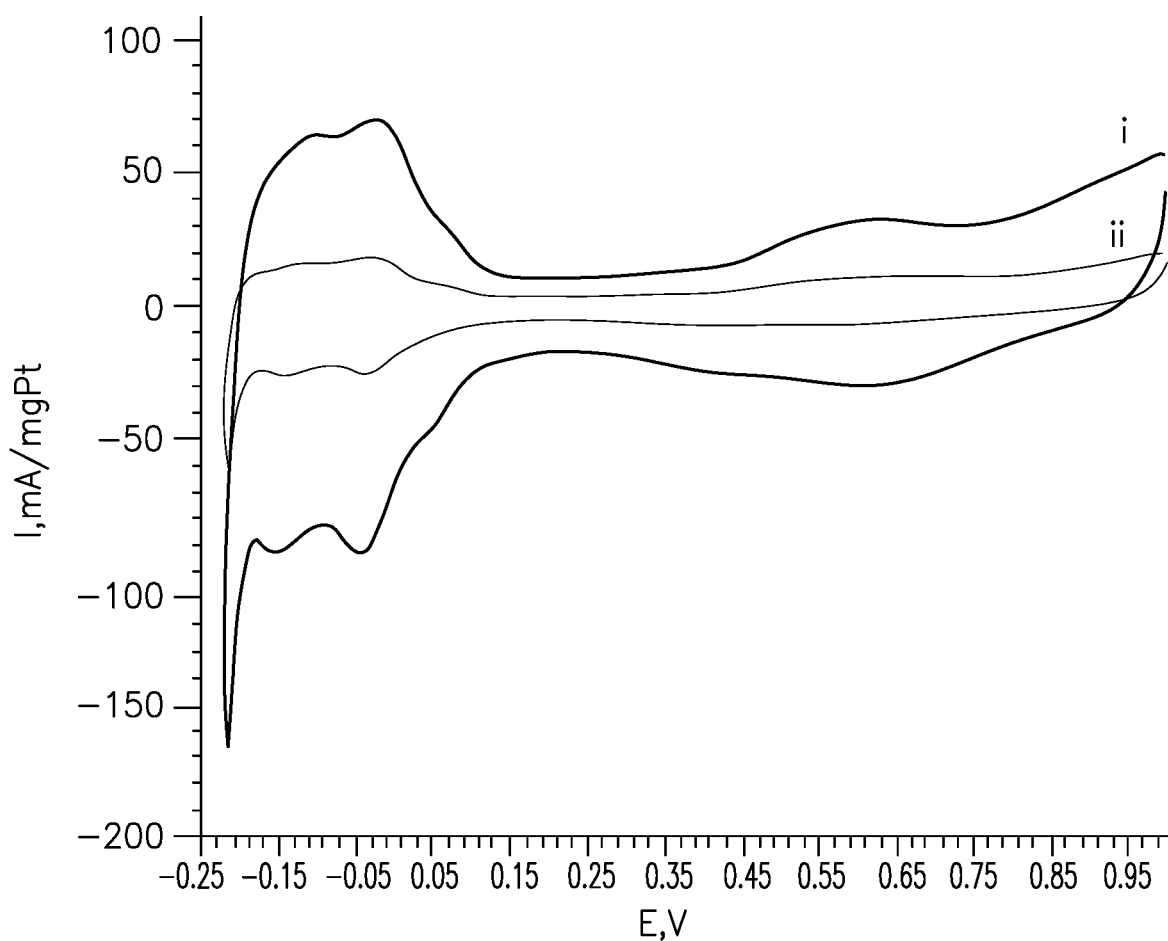
Figure 14B:
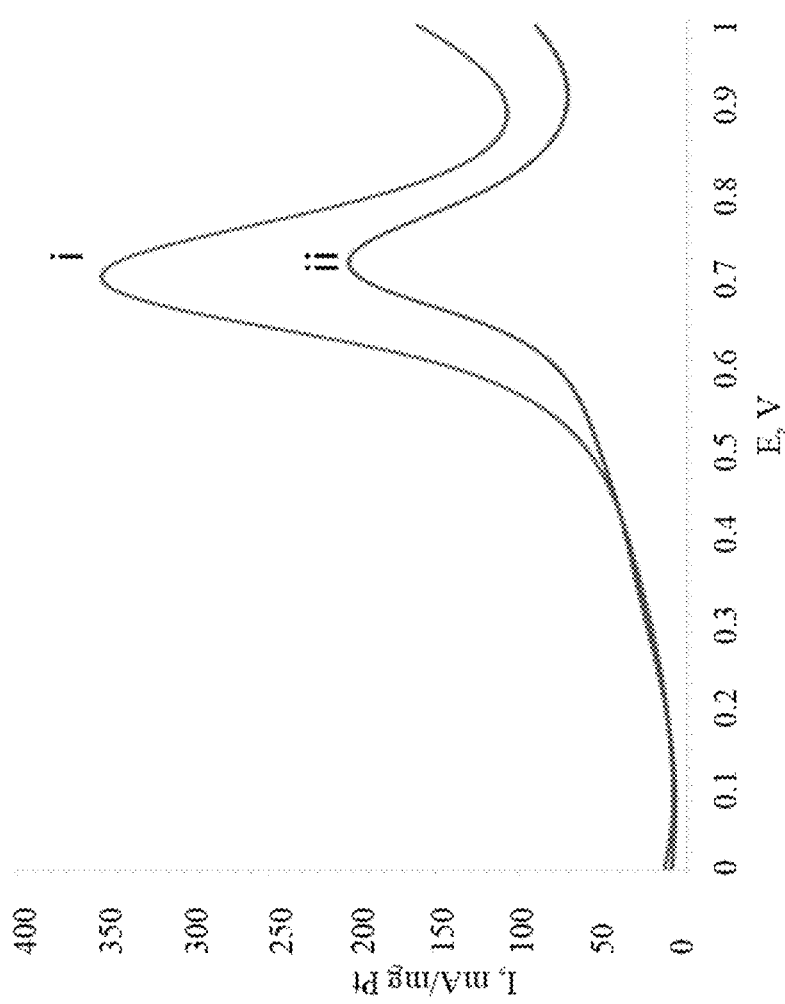

FIG. 5 presents cyclic voltammetry of oxidation of formic acid (FA) on Pt@Sn (lower graph) and PtSn@Sn (upper graph) catalyst in 0.5 M $H_2SO_4$ and 1.0 HCOOH;

FIG. 6 presents cyclic voltammetry of oxidation of methyl formate (MF) on Pt@Sn (lower graph) and PtSn@Sn (upper graph) catalyst in 0.5 $HCOOCH_3$ and 1.0 M $H_2SO_4$;

FIG. 7 presents cyclic voltammetry of oxidation of methanol on Pt@Sn (lower graph) and PtSn@Sn (upper graph) catalyst in 0.5 $HCOOCH_3$ and 1.0 M $H_2SO_4$;

FIGS. 8A-D present SEM images of Pt electroless deposition on Sn electrodeposited nano-structured electrodes immersed in electroless solution containing 10 mM $K_2PtCl_4$ and 50 mM $H_2SO_4$ for: 5 sec (FIG. 8A), 30 sec (FIG. 8B), 1 min (FIG. 8C) and 5 min (FIG. 8D); bars are 1 μm;

FIGS. 9A-C present high-resolution transmission electron microscopy (HRTEM) images of pristine Sn nano-structures (FIG. 9A) and after immersion in 10 mM $K_2PtCl_4$/50 mM $H_2SO_4$ solution for: 1 min (FIG. 9B), 5 min (FIG. 9C);

FIG. 10 presents a graph showing the methanol oxidation on Pt electroless deposited electrodes prepared by immersion in 10 mM $K_2PtCl_4$ and different acid solutions (0.5 M $H_2SO_4$/1 M methanol solution, scan rate=20 mV/sec);

FIG. 11 presents a graph showing the UV-Vis spectra of $K_2PtCl_4$ in water and $K_2PtCl_4$+$SnCl_2$ with Pt to Sn molar ratio of 1 to 5, in 80% ethylene glycol and 20% water solutions (Pt concentration=0.1 mM);

FIG. 12 presents X-ray diffraction (XRD) patterns of Sn powder after immersion in 10 mM $K_2PtCl_4$ (a) and 10 mM $K_2PtCl_4$/50 mM $SnCl_2$ (b) solutions;

FIGS. 13A-B present sol cyclic voltammetry (CV) current vs. potential curves of Pt electroless deposited electrodes prepared by immersion in 10 mM $K_2PtCl_4$ solution in 0.5 M $H_2SO_4$ (FIG. 13A), and 0.5 M $H_2SO_4$ containing 1 M methanol solution (scan rate=100 mV/sec) (FIG. 13B);

FIGS. 14A-B present cyclic voltamograms of PtSn produced by electroless deposition on Sn electrodes prepared by immersion in 10 mM $K_2PtCl_4$/50 mM $SnCl_2$ solution in 0.5 M $H_2SO_4$ solution (FIG. 14A) and 0.5 M $H_2SO_4$/1 M methanol solution (scan rate=100 mV/sec) (FIG. 14B).

Figure 15A:
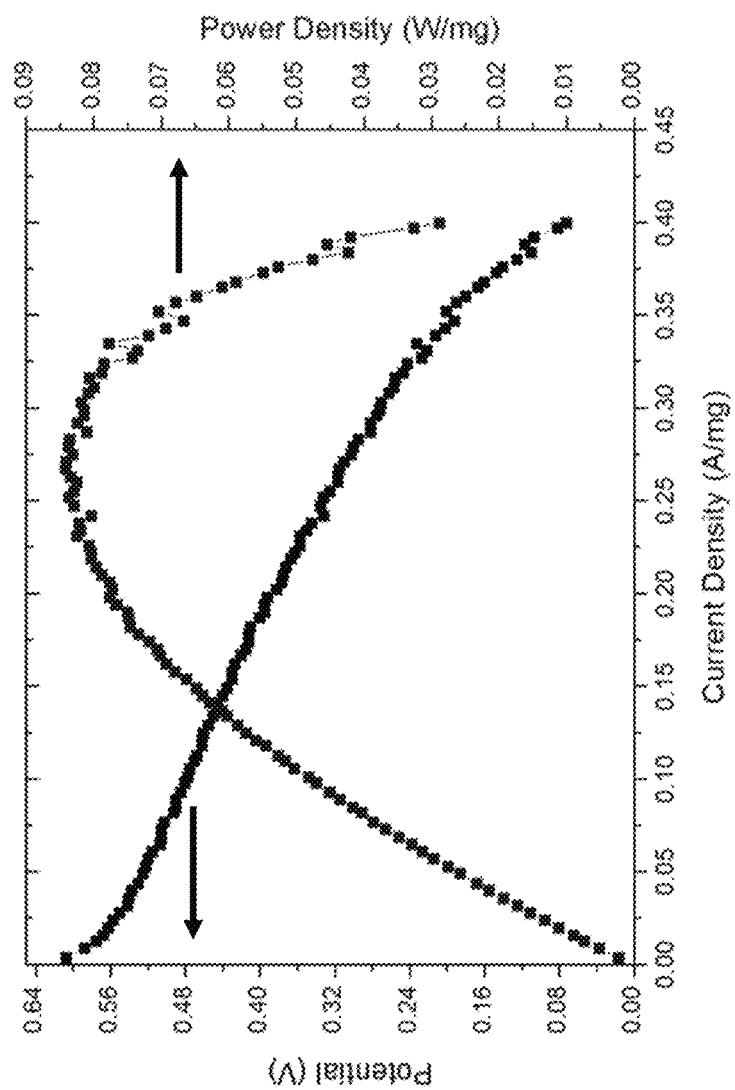
Figure 15B:
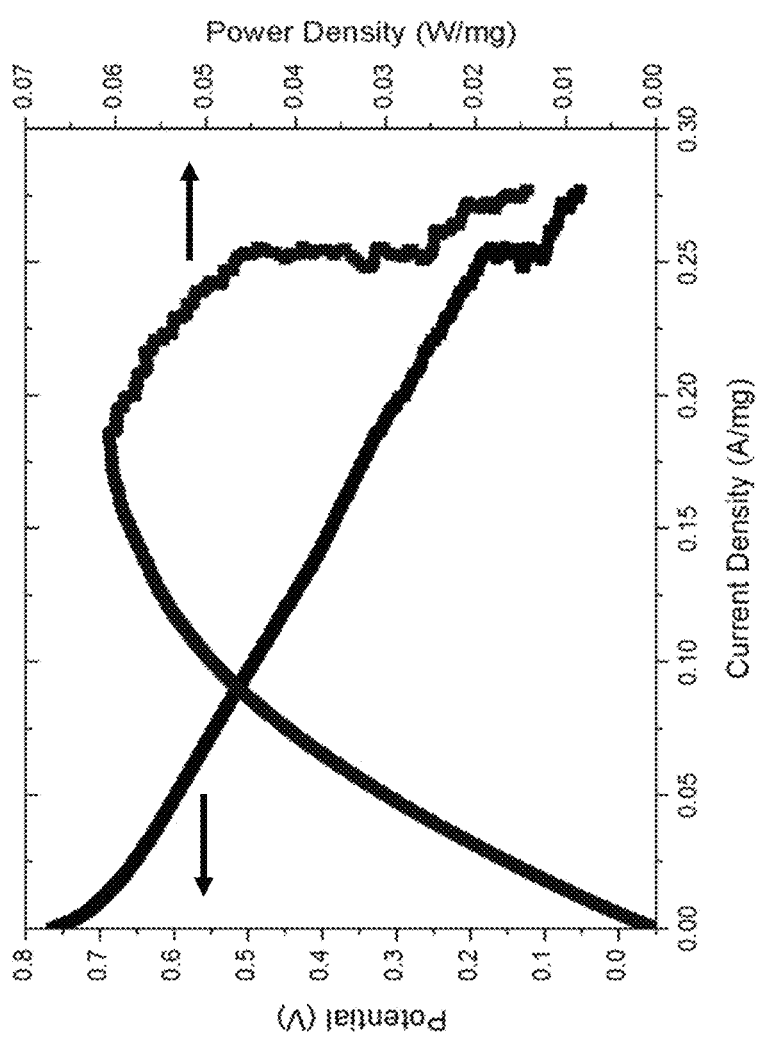
Figure 16A:
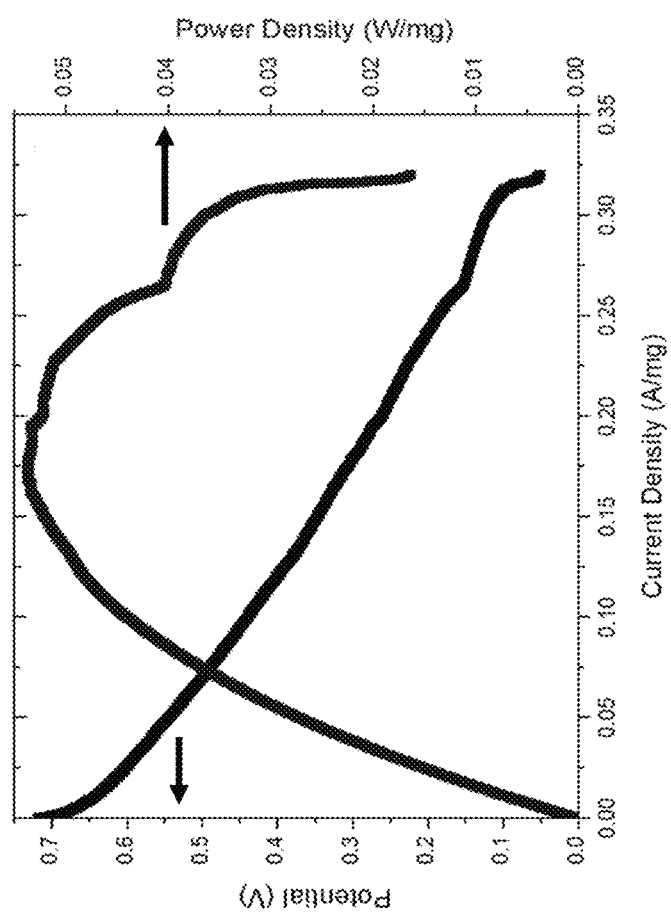
Figure 16B:
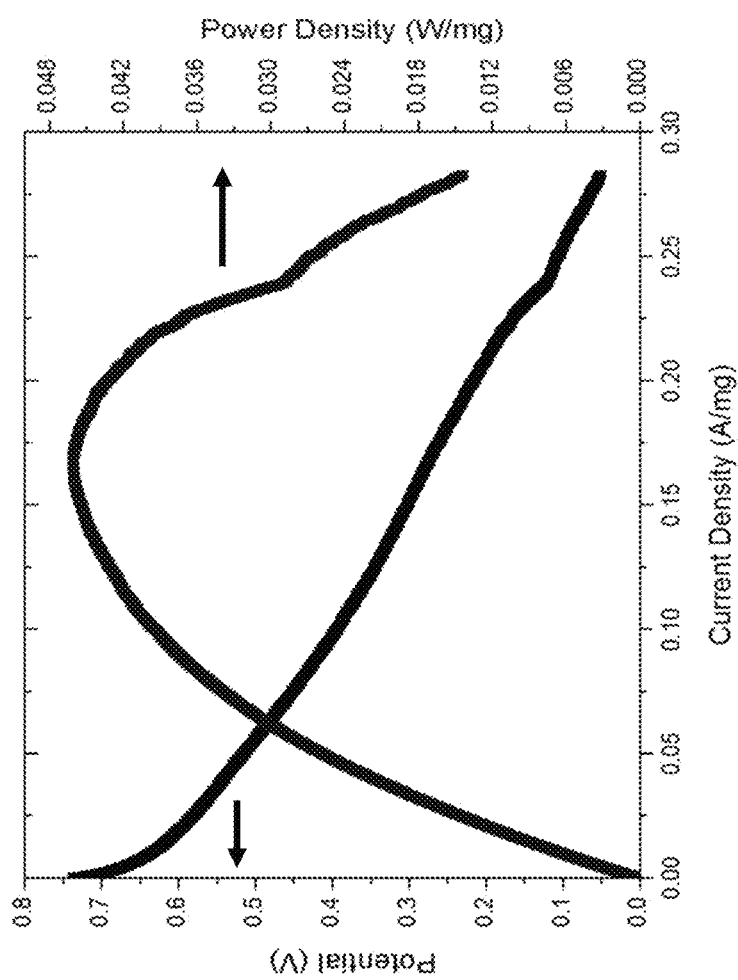
Figures 17A, 17B:
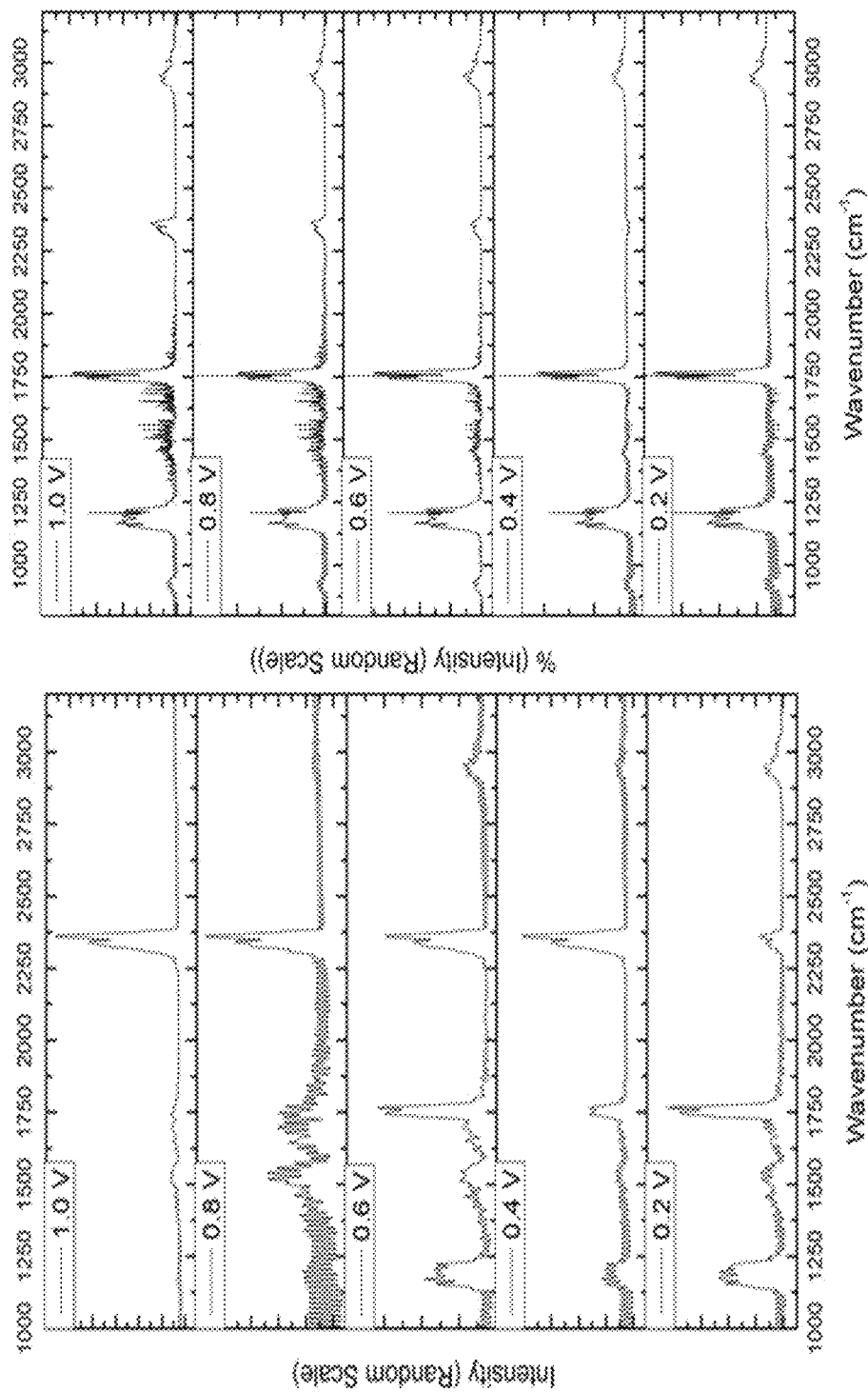
Figures 18A, 18B:
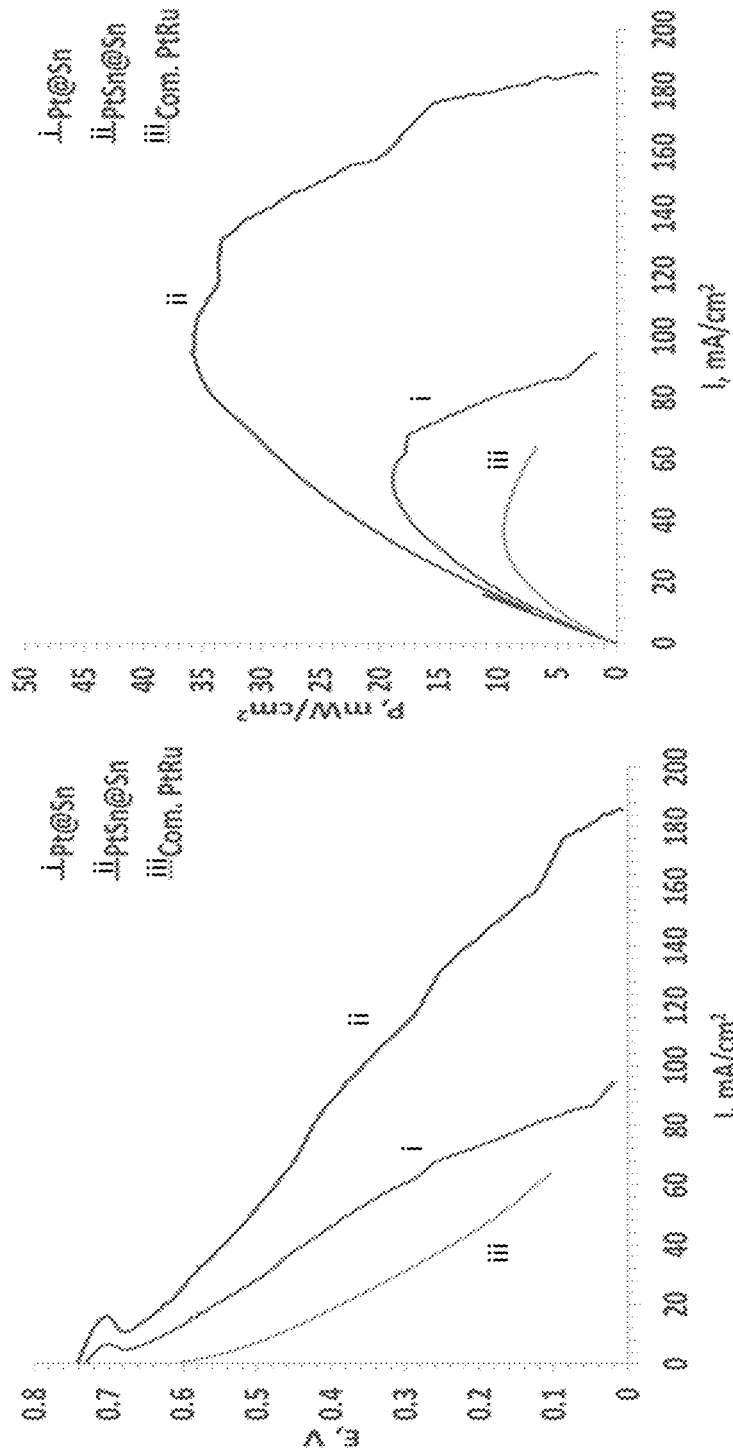
Figure 19:
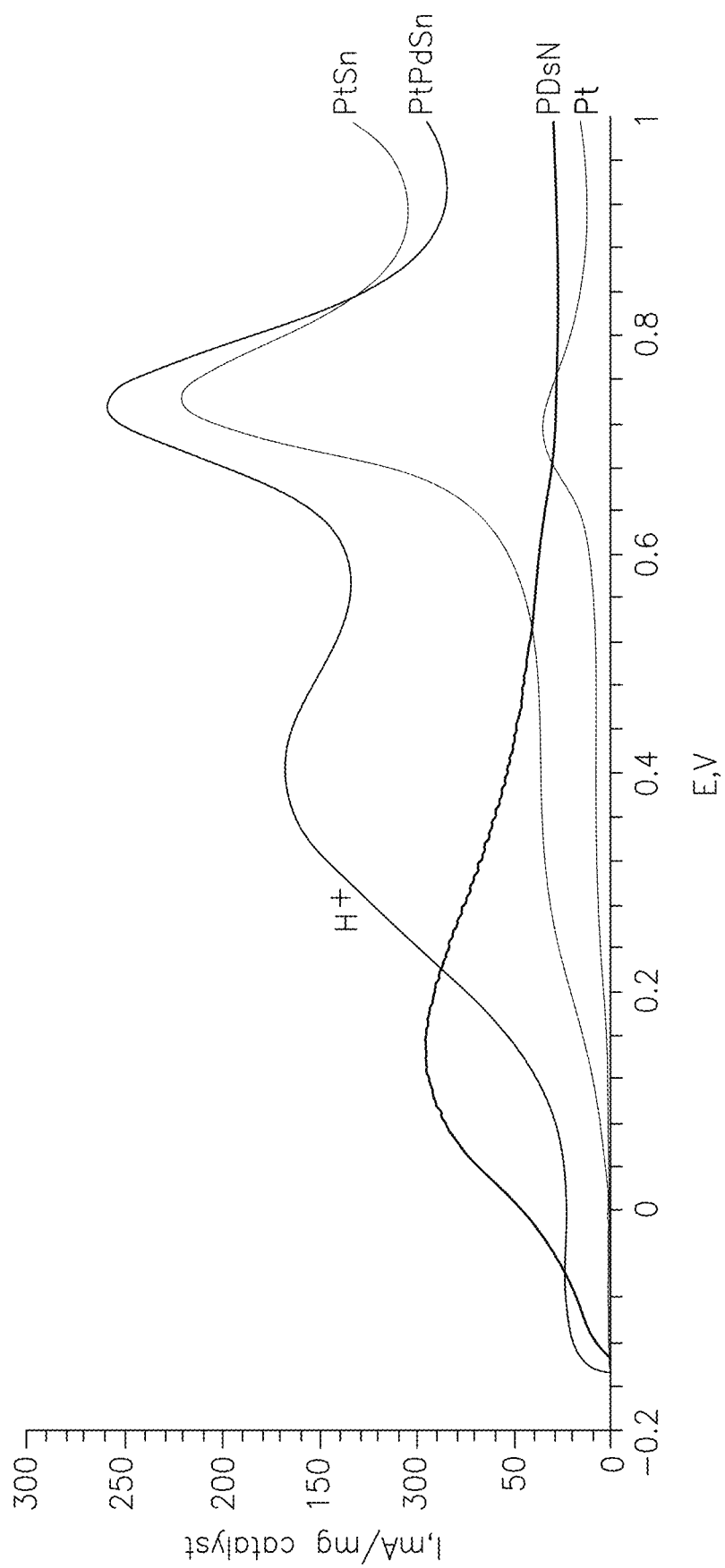
Figure 20:
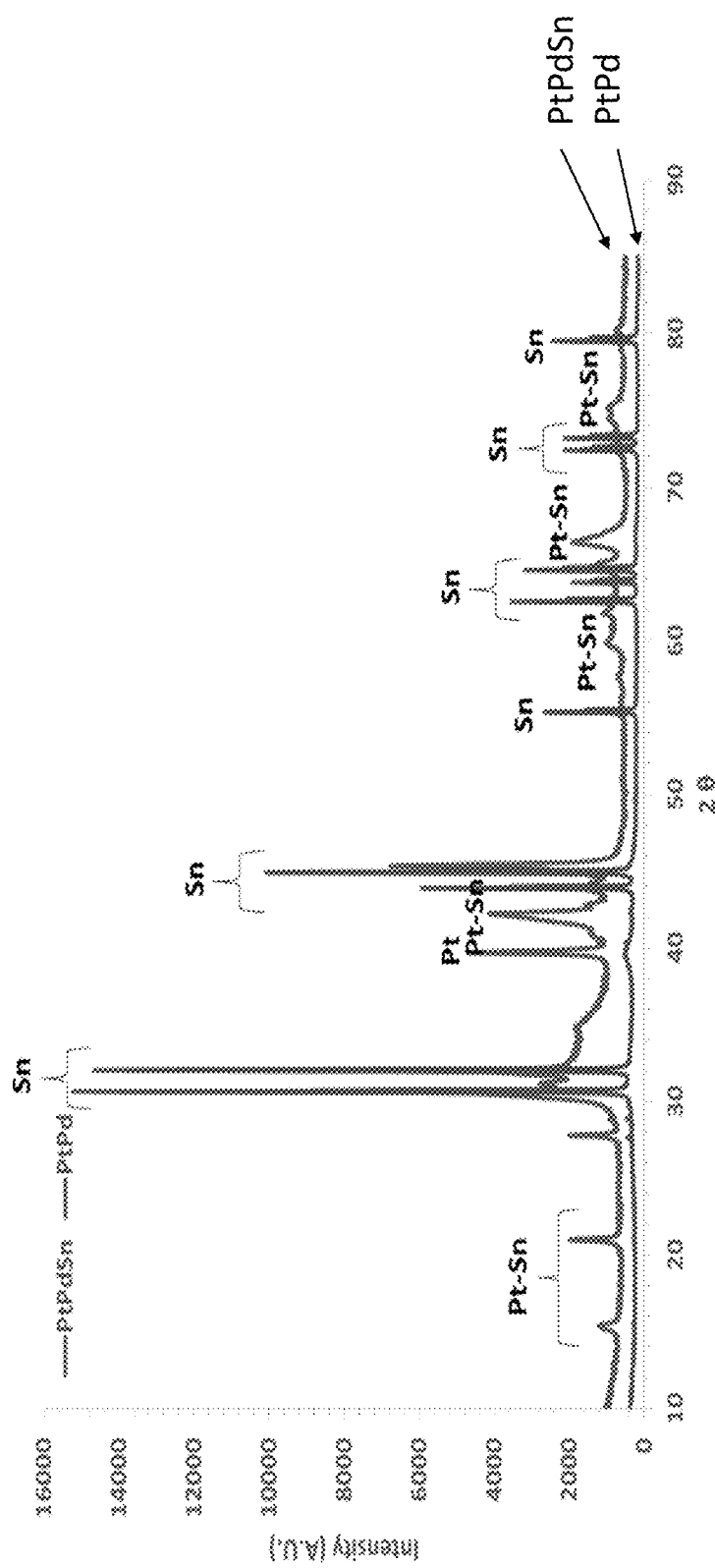
Figure 23:
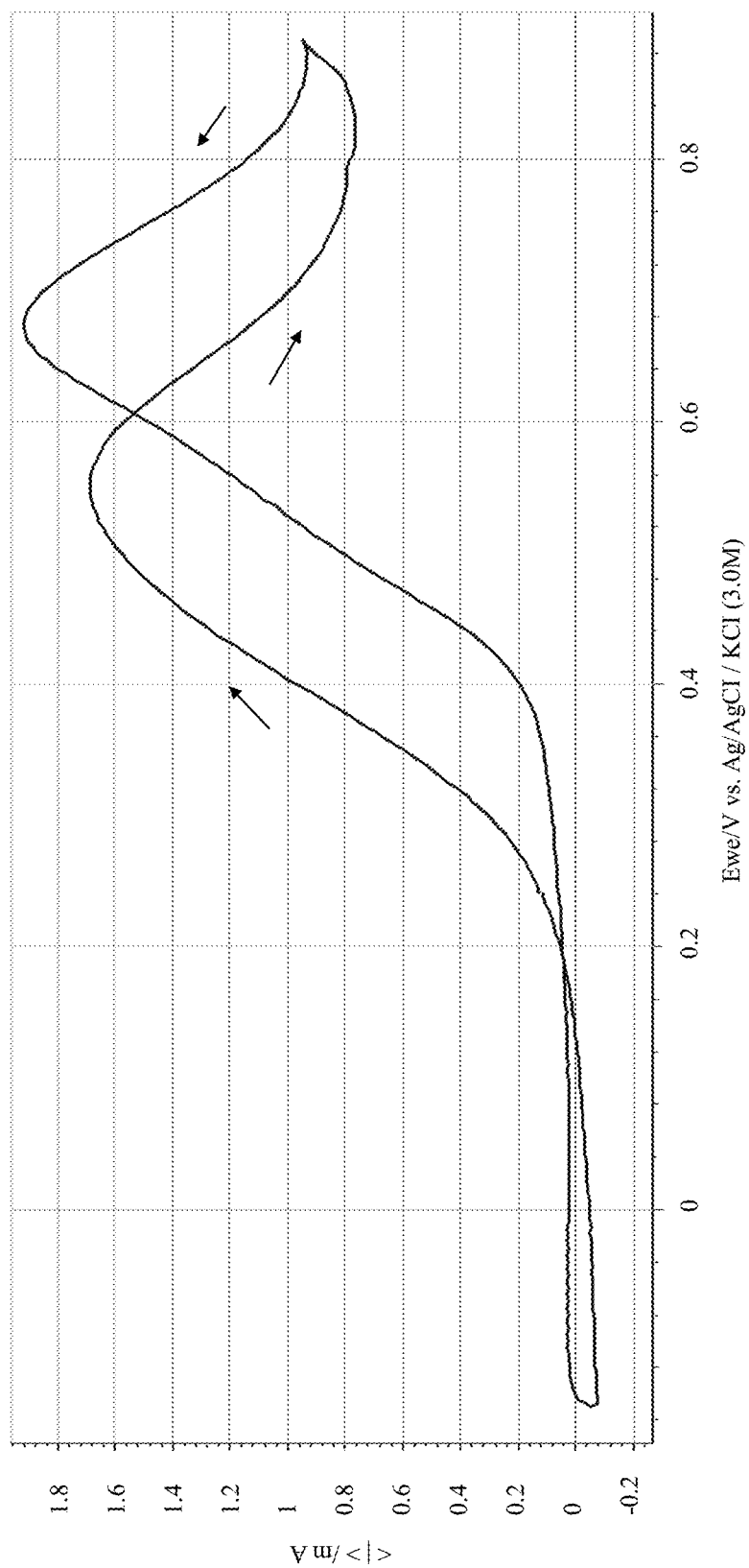

FIGS. 15A-B present a single cell operation of formic acid (FA) (FIG. 15A) and methyl formate (FIG. 15B) on PtSn@Sn catalyst at 70° C.; arrows mark the relevant axis of each curve;

FIGS. 16A-B present single cell operation of FA (FIG. 16A) and MF (FIG. 16B) on PtSn@Sn catalyst at 70° C.; arrows mark the relevant axis of each curve;

FIGS. 17A-B present online Fourier transform infrared spectroscopy (FTIR) of formic acid (FIG. 17A) and methyl formate (MF; FIG. 17B) oxidation on PtSn@Sn;

FIGS. 18A-B present power vs current curves of fuel cell with electroless deposited Pt electrode (anode: 1M methanol, cathode: humidified air);

FIG. 19 presents MF oxidation on electrodes comprised of selected electroless deposited catalysts (0.5 M $H_2SO_4$/1 M MF solution, scan rate=100 mV/sec);

FIG. 20 presents XRD patterns of PtPd and PtPdSn synthesized on Sn particles;

FIGS. 21A-D present methanol (FIG. 21A), FA (FIG. 21B), MF (FIG. 21C) and dimethyl ether (DME; FIG. 21D) oxidation on PtPd electroless deposited electrodes synthesized by immersion in $K_2PtCl_4$/$PdCl_2$ solutions with different Pt:Pd atomic ratio of 1:1, 2:3 and 3:2 (0.5 M $H_2SO_4$/1 M methanol, MF, FA or DME solution, scan rate=100 mV/sec);

FIGS. 22A-D present methanol (FIG. 22A), FA (FIG. 22B), MF (FIG. 22C) and DME (FIG. 22D) oxidation on PtPdSn electroless deposited electrodes synthesized by immersion in 10 mM $K_2PtCl_4$/10 mM $PdCl_2$/50 mM $SnCl_2$ solutions at different immersion time spans (0.5 M $H_2SO_4$/1 M methanol, MF, FA or DME solution, scan rate=100 mV/sec); and FIG. 23 presents graphs showing cyclic voltammetry of Pt on lead (Pb) support in 0.5 M $H_2SO_4$ and 1M methanol.

DETAILED DESCRIPTION OF THE INVENTION

The present invention, in some embodiments thereof, relates to platinum-tin based catalysts.

The present inventors have successfully designed, inter alia, a catalyst structure (e.g., in the form of a particle) comprising tin or lead film, a particle or a core, covered with the outermost layer comprising an active metal, e.g., platinum (Pt), palladium, or any alloy thereof (e.g., Pt alloy) (hereinafter the outermost layer may be referred to as "Pt shell"). "X@Y", or "X/Y" may denote a core shell structure, wherein "Y" represents the core and "X" represents the shell.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

According to an aspect of some embodiments of the present invention, there is provided a composition comprising an element selected from tin (Sn), lead (Pb), antimony (Sb) or a combination thereof, wherein the Pb, the Sn, the Sb, or their combination are coated by a shell, wherein the shell comprises an active metal. In some embodiments, the shell is nanosized.

In some embodiments, the Sn or the Pb are in the form of one or more particles. In some embodiments, the Sn is in the form of a film. In some embodiments, the film is deposited on a support.

Herein, by "Sn", "Sb" or "Pb", it is further meant to encompass an alloy of each one thereof. As used herein, "Sn", "Sb" or "Pb" assign elements in an elemental state, wherein the term "elemental state" refers to zero oxidation state of an atom.

In some embodiments, the term "film", as used herein, is a body having a thickness which is e.g., 2, 4, 6, 8, 10, and 20 times, including any value therebetween, or smaller than any of its length or width dimensions, and typically, but not exclusively, having an overall shape of a thin sheet.

In some embodiments, the term "film" refers to a flat or tubular structure e.g., a sheet having substantially greater area than thickness.

In some embodiments, the shell is characterized by a thickness of less than 50 nm.

Hereinthroughout, the terms "nanosized", and "nanoparticle" (NP), describe a film, or a particle, respectively, featuring a size of at least one dimension thereof (e.g., diameter) that ranges from about 1 nanometer to 1000 nanometers.

In some embodiments, the size of the particle or of the film described herein represents an average size of a plurality of shells or nanoparticles, respectively.

In some embodiments, the average or the median size (e.g., diameter, or length of the particle) ranges from about 1 nanometer to 500 nanometers. In some embodiments, the average size or median ranges from about 1 nanometer to about 300 nanometers. In some embodiments, the average or median size ranges from about 1 nanometer to about 200 nanometers. In some embodiments, the average or median size ranges from about 1 nanometer to about 100 nanometers. In some embodiments, the average or median size ranges from about 1 nanometer to 50 nanometers, and in some embodiments, it is lower than 35 nm. In some embodiments, the average size or median is about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 40 nm, about 42 nm, about 44 nm, about 46 nm, about 48 nm, or 50 nm, including any value and range therebetween.

In some embodiments, the term "shell", as used herein, refers to the coating domain surrounding the film.

In some embodiments, by "film is coated by a shell" it is meant to refer to a composition of two or more entities, namely an entity that defines an enclosure (the enclosing entity, e.g., the shell) and the entity (or entities) that is being at least partially enclosed therein, i.e. the film. In addition, in some embodiments, the coating may be conformal with the exact contour of the film.

A film or particle(s) coated by a shell may be characterized by discrete inner and outer surfaces wherein the inner surface constitutes the boundary of the enclosed area or space. The enclosed area or space may be secluded from the exterior area of space which is bounded only by the outer surface.

In some embodiments, the closure of the enclosing entity depends on the size, shape and chemical composition of the entity that is being enclosed therein, such that the enclosing entity may be "closed" for one entity and at the same time be "open" for another entity. For example, structures presented herein may be closed with respect to certain chemical entities which cannot pass through their enclosing shell, while the same "closed" structures are not closed with respect to other entities.

In some embodiments, the tin film is in a dendritic form (also referred to "structure", or "shape", interchangeably). In some embodiments, the tin film is at least partially oxidized (e.g., in the form of $SnO_2$ or $SnO$).

In some embodiments, the term "core-shell" refers to a mixed phase comprising metal or metal oxide, or any combination thereof.

In some embodiments, the term "dendritic structure" herein employed refers to a structure having flake-shaped (flaky) substructures. In some embodiments, these structures are constituted by aggregation of particles are gathered in a large number while having branch points.

In some embodiments, the length in lateral direction of one of the flaky substructures is from 5 nm to 200 nm. Incidentally, the term "length in lateral direction" herein employed refers to a smallest dimension within a plane of one flake.

In general, dendritic compounds comprise a core and/or a focal point and a number of generations of ramifications (also known and referred to as "branches" or "branching units") and an external surface. The generations of ramifications are composed of repeating structural units, which extend outwards radially from the core or of the focal point. In some embodiments, dendrimers are also referred to as structures characterized by a tree-like structure and are built from several dendron units that are all connected to a core unit via their focal point. Typically, but not exclusively, dendritic macromolecules possess a perfectly cascade-branched, highly defined, synthetic structure, characterized by a combination of high-group functionalities and a compact structure.

In some embodiments, Sn film is in the form of dendritic structure having a stem and branches characterized by a ratio of 1:1 to 10:1, respectively. In some embodiments, Sn film is in the form of dendritic structure having a stem and branches characterized by a ratio of 1:1 to 5:1, respectively.

In some embodiments, the term "alloy" refers to a monophasic or polyphasic metallic material of a binary or polynary system. In some embodiments, the starting components (e.g., alloy elements) may enter into metallurgical interactions with one another and thereby lead to the formation of new phases (e.g., mixed crystals, intermetallic compounds, super-lattice).

In some embodiments, the alloy can include deposition of two or more target materials, so as to form a di-segmented nanostructure (e.g., if two or more target metals are deposited sequentially), a tri-segmented nanostructure (e.g., if three or more target metals are deposited sequentially), etc. In some embodiments, at least one of the deposited metals may to be etched at later stages of the process. The disclosed process may include the deposition of one or more such target materials.

Representative example of target materials suitable for the present embodiments, include, without limitation, metals, semiconductor materials and organic polymers.

Non-limiting exemplary metals that are suitable for use in the context of any of the embodiments described herein include any metal or a metal alloy that is compatible with electrochemical deposition. In some embodiments, the selected metal has properties (e.g., electrical properties) that can be utilized in nanoscale applications. Metal alloys, comprising two or metals as described herein, are also contemplated, as exemplified in the Examples section below.

In some embodiments, the metal is an active metal (M).

The term "active metal" used herein means a metal such as, without being limited thereto, transition metals which presents catalytic activity.

Non-limiting examples M are platinum (Pt), palladium (Pd), rhodium (Rh), iridium (Ir), Sn, lead, antimony, ruthenium (Ru), iridium, molybdenum, cobalt, iron, manganese, osmium, or a combination or alloy thereof.

Deposition of metal alloys may be performed either by co-depositing (simultaneously) the metals from two or more separate electrolyte solutions, each containing ions of a different metal, or by depositing an electrolyte solution that contains a mixture of metal ions. Representative examples include, without limitation, gold (Au), silver (Ag), platinum (Pt), nickel (Ni), titanium (Ti), titanium tungstide and indium-tin-oxide.

In some embodiments, the shell comprises Pt. In some embodiments, the shell comprises Pd. In some embodiments, the shell comprises Pt and Pd.

In some embodiments, the shell comprises Pt and Pd in a ratio of e.g., 5:1, 4:1 2:1, 1.5:1, 1.4:1, 1.3:1, 1.2:1, 1.1:1, 1:1, 1:1.1, 1:1.2, 1:1.3, 1:1.4, 1:1.5, 1:2, 1:3, 1:4, or 1:5, respectively, including any value, ratio and range therebetween (hereinthroughout, by "ratio" it is meant to refer to molar ratio).

In some embodiments, the shell comprises Pt and Pd in a ratio of from 1.5:1 to 1:1.5, respectively.

In some embodiments, the desired Pt to Pd ratio may be predetrimined so as to fit the material to be oxidized. For example, methyl formate (MF) may oxidize at a higher ratio of Pt to Pd, respectively. Further embodiments of the catalyst are described in the Examples section below.

In some embodiments, the core or the mixed phase comprise Sn, Pb, antimony, or an oxide thereof, and the shell or the other phase within the mixed phase comprise Pt, Pd, or their combination. In some embodiments, the ratio of Pt or the Pd (e.g., within the shell) to Sn (e.g., within the core) is from 10:1 to 1:10, or, in some embodiments, from 1:5 to 5:1, or in some embodiments, from 3:1 to 1:3, e.g., 3:1, 2:1, 1:1, 1:2, or 1:3, including any value and range therebetween. In some embodiments, the ratio is from 1:4 to 1:5. In some embodiments, the when deposited on tin dendrites the Pt (or the Pd) to Sn ratio may be higher according to the agent to be oxidized. Further embodiments are described in the Examples section that follows.

In some embodiments, the composition is in the form of a mixed phase comprising an oxide of Sn, and Pt and Pd, wherein the ratio of Pt to Sn is from 3:1 to 1:3, e.g., 3:1, 2:1, 1:1, 1:2, or 1:3, including any value and range therebetween.

In some embodiments, the Sn nano-structure allows to enhance the electro-oxidation process due to the synergistic effect of Sn on the noble active metal.

In some embodiments, the shell comprises an active metal and an element selected from Sn, lead (Pb), Ru, selenium (Se), or any combination thereof.

In some embodiments, the composition further comprises a substrate. Without being bound by any particular theory or mechanism, it is assumed that the durability of the catalyst may be improved because of the "anchoring" effect of the Sn to a substrate.

In some embodiments, the composition comprises a core made of Pb and a shell comprising: Pt, PtSn, PtPd, PtPdSn, or PtPdSnO$_x$. In some embodiments, such compositions may be placed e.g., in an acid solution, and be utilized for oxidation of fuel as described herein e.g., methanol).

In some embodiments, the Sn (e.g., Sn film) is deposited on at least one surface of the substrate.

In some embodiments, the composition further comprises a substrate, wherein the Sn film is:

(a) deposited on at least one surface of the substrate;
(b) coated by the material comprising the one or more metal (e.g., active metal NPs).

Herein, in some embodiments, a plurality of the NPs is characterized by a size of from about 1 to about 100 nanometers, or from about 1 to about 50 nanometers, or in some embodiments, from about 1 to about 10 nanometers.

Herein, the term "size" may refer to either the average of at least e.g., 70%, 80%, or 90% of the particles, or in some embodiments, to the median size of the plurality of nanoparticles.

For simplicity, the expression "deposited on at least one surface" is also referred to herein, as a coating on a substrate, or as a substrate or surface having a film deposited thereon, or on a portion thereof. In some embodiments, the Sn film is incorporated in and/or on at least a portion of the substrate. In some embodiments, the term "coating" and any grammatical derivative thereof, is defined as a coating that (i) is positioned above the substrate, (ii) is not necessarily in contact with the substrate, that is to say one or more intermediate coatings may be arranged between the substrate and the coating in question, or (iii) does not necessarily completely cover the substrate.

Substrate usable according to some embodiments of the present invention may comprise, for example, organic or inorganic surfaces.

In some embodiments, the substrate is selected from, but is not limited to, carbon, a metal oxide, a polymer, or any combination thereof.

Non-limiting exemplary substrates are selected from activated carbon, graphite, carbon nanotube, metal mesh or foam, ceramic materials, or any combination thereof.

Fuel Cell

In some embodiments, there is provided a fuel cell having an electrocatalyst comprising the disclosed composition. In some embodiments, the electrocatalyst is the anode.

In some embodiments, the term "electrocatalyst" refers a specific form of catalyst that functions at electrode surfaces or, in some embodiments, may be the electrode surface itself.

In some embodiments, the term "fuel cell" is a device that converts the chemical energy from a fuel into electricity through a chemical reaction of positively charged hydrogen ions with oxygen or another oxidizing agent.

The present inventors have now surprisingly uncovered that the disclosed electrocatalyst shows enhance activity toward the oxidation of fuels.

In some embodiments, the fuel cell is used for the oxidation of fuels, such as, and without being limited thereto, methanol, ethanol, formic acid (FA), formaldehyde, and glucose.

In some embodiments, the fuel(s) are delivered to the disclosed fuel cell in high vapor pressure (low boiling point), enabling their supply as fumes/gas directly to the cell anode.

In some embodiments, the electrode preparation methods described herein, are utilized in manufacturing various types of fuel cells, including, without limitation, phosphoric acid electrolyte fuel cells, polymer electrolyte fuel cells, and alkaline fuel cells.

In some embodiments, the electrocatalyst is characterized by an improved electrochemical surface area. In some embodiments, the electrocatalyst is characterized by an electrochemically active surface area of e.g., at least 30 $m^2g^{-1}$ at least 40 $m^2g^{-1}$, at least 50 $m^2g^{-1}$, at least 60 $m^2g^{-1}$, at least 75 $m^2g^{-1}$, or at least 80 $m^2g^{-1}$.

Exemplary fuel cells are described in the Examples section that follows. The practiced fuel cells show high electrical efficiency for long periods of continuous operation.

In some embodiments, the current-density peak for FA oxidation on the disclosed catalyst is between 100 mA/mg to 500 mA/mg. In some embodiments, the current-density peak for FA is between 250 mA/mg to 300 mA/mg. In some embodiments, the current-density peak for MF oxidation on the disclosed catalyst is between is between 100 mA/mg to 500 mA/mg. In some embodiments, the current-density peak for FA is between 220 mA/mg to 270 mA/mg.

In some embodiments, the peak of power density delivered by fuel cell using the disclosed catalyst for FA is between 0.050 mW/mg to 0.100 mW/mg. In some embodiments, the peak of power density delivered by fuel cell using the disclosed catalyst for FA is between 0.070 mW/mg to 0.090 mW/mg. In some embodiments, the peak of power density delivered by fuel cell using the disclosed catalyst for MF is between 0.050 mW/mg to 0.100 mW/mg. In some embodiments, the peak of power density delivered by fuel cell using the disclosed catalyst for FA is between 0.050 mW/mg to 0.070 mW/mg.

As exemplified in the Examples section below, the current-density peak for FA and MF oxidation on PtSn@Sn catalyst is 275 mA/mg and 240 mA/mg, respectively. Similarly, the peak of current-density for FA and MF oxidation on Pt@Sn catalyst is 200 mA/mg and 190 mA/mg, respectively. The peak of power density delivered by laboratory prototype fuel cell using PtSn@Sn catalyst for FA and MF is 0.085 mW/mg and 0.060 mW/mg, respectively.

As further exemplified in the Examples section below, the practiced fuel cells efficiently perform with various air cathodes (having different catalysts) and with various solid membrane separators. A fuel cell system containing a uniquely designed solid membrane separator may also be practiced.

In some embodiments, the fuel cell system described herein operates at room temperature, although higher temperatures are also contemplated, e.g., 30° C., 40° C., 35° C., 60° C., or 70° C.

The catalyst described herein may be introduced into a reformed fuel cell system. For example, biofuels may be used in these reformed fuel cell system as the primary fuel, wherein a means of recovering hydrogen gas is required. In some embodiments, the disclosed catalyst may be used in carbon monoxide contaminated fuel.

Preparation Methods

In some embodiments, there is provided a process for manufacturing the disclosed electrocatalyst, e.g., electrocatalyst comprising a substrate as described above, having attached thereon an Sn film, wherein: the Sn film is coated by one or more active metal NPs and optionally by an element selected from, without being limited thereto, Sn, ruthenium (Ru), selenium (Se), or any combination thereof.

In some embodiments, the process comprises the steps of: (i) electrodepositing the Sn film on the substrate; and (ii) plating a material comprising the active metal NPs and optionally the M on the Sn film, thereby obtaining the catalyst.

In some embodiments, step (ii) is performed by electroplating. In some embodiments, step (ii) is performed by electroless plating of a metal substance on a substrate, e.g., conducting substrate, as described hereinthroughout. In some embodiments, step (ii) is performed by electrodeposition.

In some embodiments, electroless deposition (plating) refers to a catalytic or autocatalytic process whereby a chemical reducing agent reduces a metallic salt onto specific sites of a catalytic surface which can either be an active substrate or an inert substrate seeded with an active metal.

In some embodiments, electroless deposition (plating) refers to a chemical process of oxidation and/or reduction by which a metallic ion is reduced from a solution (e.g., an aqueous solution) containing a reducing agent on a surface having a lower standard reduction potential catalytic site without the need of applying a current. As further described in the Examples section below, a viscous liquid or a solution thereof (e.g., aqueous solution), for example, and without limitation, ethylene glycol or propylene glycol, may be utilized, thereby assisting obtaining a uniform coating.

In accordance with some embodiments of the present disclosure, electroless deposition provides a method for controlled deposition of Pt, Pb, or other metal atoms on Sn previously deposited on a carbon support. In some embodiments, during electroless deposition, the temperature, and concentrations of metal salts, reducing agents, and of complexing agents may be modified to give controlled rates of metal deposition on the seed nuclei. Thus, it becomes possible to chemically deposit Pt onto Sn, resulting in the formation of very small metal particles having surface/volume ratios approaching unity. In some embodiments, in this manner, the required loading of Pt necessary for satisfactory fuel cell performance can be dramatically lowered, resulting in significant savings on fuel cell costs.

In some embodiments, the use of electroless deposition to fabricate Pt-containing electrocatalysts results in the formation of small particles that possess core-shell geometry. This geometry offers the possibility of improving many aspects of fuel cell performance. In accordance with certain aspects of the present disclosure, the core can be some metal other than Sn. Without being bound by any particular theory, it is assumed that if the e.g., Pt shell thickness is thin enough, the core metal may be close enough to the surface to perturb the physical properties of the Pt surface layer (shorter Pt—Pt lattice parameters) and electronic properties of the surface Pt sites (Pt d-orbital vacancies).

In some embodiments, step (ii) is performed by a technique which is useful for depositing metallic coatings onto substrates, for example, and without being limited thereto, sputtering, chemical vapor deposition, ion beam enhanced deposition, plasma-assisted vapor deposition, cathodic arc deposition, or ion implantation and evaporation.

In some embodiments, step (ii) is performed by chemical reduction. There are several different reducing agents that may be used for electroless deposition in accordance with some embodiments of the present disclosure that include, but are not limited to, sodium hypophosphite, ethylene glycol, hydrazine, dimethyl-amine borane, diethyl-amine borane, sodium borohydride, formaldehyde, and hydrogen gas.

In some embodiments, the electrochemical deposition is accomplished by the reduction of metal ions from an electrolytic solution through the application of a negative potential. This may be performed for instance, at cyclic voltammetry mode, galvanic displacement, galvanostatic mode (constant current), or potentiostatic (constant voltage) mode or cyclic-voltammetry conditions.

As a specific embodiment, the method for preparing a PtSn nanoparticle catalyst includes preparing a precursor solution of Pt salt, and in another specific embodiment, the solution for galvanic deposition of PtSn alloy on Sn is prepared by dissolving $K_2PtCl_4$ and $SnCl_2$ in ethylene glycol and water (e.g., 80:20) containing $H_2SO_4$.

Further embodiments of this section are presented in the Examples section below.

General

As used herein the term "about" refers to ±10%.

The terms "comprises", "comprising", "includes", "including", "having" and their conjugates mean "including but not limited to". The term "consisting of means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, and electronical arts.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

EXAMPLES

Reference is now made to the following examples, which together with the above descriptions illustrate some embodiments of the invention in a non-limiting fashion.

Materials and Methods

Tin chloride and methyl formate were purchased from SIGMA ALDRICH™. Potassium tetrachloroplatinate ($K_2PtCl_4$) were purchased from STREM™ Chemicals. Methanol, formic acid, sulfuric acid, nitric acid and ethylene glycol were purchased from MERCK®. TORAY™ carbon sheet (TGP H090™) was purchased from fuel cell stores. Commercial Platinum Ruthenium (50:50) and platinum black catalyst was purchased from ALFA AESAR™ and BASF™ respectively. All reagents were of analytical grade and were used without any further purification. NAFION® 115 membrane was purchased from ION POWER™, INC. Deionized water with resistivity of >18.0 MΩ was used throughout the synthetic processes and electrochemical measurements.

Preparation of Catalysts:

Electro-deposition of tin was performed on one square centimeter of TORAY™ carbon. The solution for electro-deposition was prepared by dissolving tri sodium citrate (0.05M) and tin chloride (0.018M) in deionized water. Tin chloride solution (25 ml) was purged with nitrogen and electro-deposition was performed using chronoamperometry. The potential and charge used for electro-deposition was −3.0V and 10 C, respectively. After tin deposition electrodes were washed with deionized water then with acetone and dried under nitrogen.

Four types of solutions were prepared for electroless process and fabricated electrodes were named accordingly, as presented in Table 1:

TABLE 1

| Sample No. | Solution | Catalyst | Code | Solution |
|---|---|---|---|---|
| 1. | Platinum | Platinum on Tin | Pt on Sn | Water + $H_2SO_4$ |
| 2. | Platinum Tin | Platinum Tin on Tin | PtSn on Sn | Water + EG (ethylene glycol) + $H_2SO_4$ |

The solution for electroless deposition of platinum ($K_2PtCl_4$) was prepared by dissolving corresponding salts (10 mM) in deionized water containing 50 mM of $H_2SO_4$. The solution for galvanic deposition of PtSn alloy on Sn was prepared by dissolving $K_2PtCl_4$ (10 mM) and $SnCl_2$ (50 mM) in ethylene glycol and water (80:20) containing 50 mM of $H_2SO_4$. The solution was purged with nitrogen before electroless deposition and electrodes were washed with deionized water, then with acetone and were dried under nitrogen. After electrochemical testing all of the electrodes were dissolved in aqua-regia and diluted to 100 times in deionized water for ICP analysis.

Preparation of Electrodes for Fuel Cell

The anode for fuel cell was fabricated by electro-deposition and galvanic replacement, as described herein, on TORAY® carbon. The cathode was fabricated by pasting commercial platinum black on carbon cloth. Platinum black was mixed with carbon powder, NAFION® and TEFLON® solution and deposited on carbon cloth. The loading of catalyst on anode and cathode side was 0.3 mg/cm$^2$ and 5.0 mg/cm$^2$. Nafion® 117 was activated by boiling in sulfuric and nitric acid and stored in deionized water. A membrane electrode assembly was made using a laboratory prototype fuel cell. Humidified air was supplied at cathode side the rate of 200 ml/min and 1.0 M fuel (Methyl Formate and Formic Acid) dissolved in water was circulated using peristaltic pump at the flow rate of 25-30 ml/min. The performance of cell was examined at different temperature. The cell was tested under load using CHROMA™ 63102 DC™ electric load.

Physical and Electrochemical Characterization

The microstructure of electrodes was analyzed by scanning electron microscopy (Hitachi S-4800 SEM). The amount of active metals (Pt/Pd) deposited on electrodes were analyzed by Varian ES-715 inductive coupled plasma (ICP). The electrochemical testing was performed at room temperature on CHI 760C and Bio-logic VSP electrochemical workstations using a conventional three-electrode cell with Pt mesh as counter electrode and Ag/AgCl (3.0 M KCl) reference electrode. The activation of the catalyst was performed by cycling in sulfuric acid in the potential range of −0.22V to 1.0V at scan rate of 100 mV/s. The oxidation of fuels was studied in 0.5M H$_2$SO$_4$ as supporting electrolyte containing 1.0 M of fuel (Formic acid and Methyl Formate). The X-ray diffraction (XRD) patterns were recorded on X-ray diffractometer (PAN analytic) using Cu Kα radiation (λ=1.54 Å). The gaseous by products were collected in a gas chamber and online FTIR was performed using Bruker spectrophotometer. Fuel cell tests were performed using laboratory prototype fuel cell (Electrochem). The cell performance was tested at different temperatures, using Chroma 63102 DC electric load. The online FTIR analysis of gaseous products of FA and MF oxidation was performed on a laboratory prototype fuel cell operating at constant temperature. The gaseous products were collected at different potentials (0.2V, 0.4V, 0.6V, 0.8V, and 1.0V). The FTIR gas cell was purged with nitrogen to take background and gaseous products were collected in evacuated gas cell. The instrument was purged with high-purity nitrogen gas and interferograms were collected at 4 cm$^{-1}$ resolution.

The fuel cell anode acts as working electrode and the cathode works both as counter and reference electrode. As noted above, formic acid and methyl formate (1.0M) in deionized water was circulated at the rate of 25-30 ml/min and humidified hydrogen on cathode side at the flow rate of 10 ml/min.

Example 1

Platinum-Tin Catalysts Via Galvanic Displacement

Material Characterizations

The scanning electron microscopy image of electro-deposited tin dendrites on porous carbon current collector (TORAY®) is shown in FIGS. 1A-B. The tin was electro-deposited at different potentials and it was found that the length and distribution of tin dendrites was more uniform when deposited at higher over potential (−3.0 V). The average length of dendrite's stem was 125-150 μm and side branches were 5-8 μm. The tin dendrites preserved their structure even after galvanic displacement by Pt of Pt@Sn and PtSn@Sn catalyst. The typical diameter of PtSn@Sn and Pt@Sn nanoparticles observed at higher magnification was 5-8 nm and 30-45 nm, respectively (as shown in FIGS. 2A-B and 3A-B, respectively). The energy dispersive X-ray mapping of tin dendrites revealed uniform distribution of platinum nanoparticles across the surface of the supporting Sn.

Electrochemical Testing

The electrochemical activity of all catalysts for oxidation of formic acid and methyl formate was investigated by cyclic voltammetry (CV) measurements in standard 3 electrode cell. The CV of electrodes in supporting electrolyte (0.5M H$_2$SO$_4$) is presented in FIG. 4.

The H-adsorption/desorption peaks are exhibited by all catalysts in potential range −0.2-0.1 V and peaks for formation/reduction of Pt oxide could be observed at 0.5-0.6 V. The hydrogen adsorption/desorption peaks of PtSn@Sn catalyst is slightly higher than Pt@Sn, that results from higher active electrochemical surface area of PtSn catalysts. The specific electrochemical active surface areas of platinum based catalysts were calculated from desorption charge of hydrogen atoms. Electrochemical surface area (ECSA) was calculated for both catalysts using following equation:

$$ECSA = \frac{Q_H}{[Pt]*0.21}$$

where [Pt] represents the platinum loading (mg/cm$^2$) on the electrode, $Q_H$ denotes the charge for hydrogen desorption (mC/cm$^2$) and 0.21 represent the charge required to oxidize a monolayer of H$_2$ on bright Pt or monolayer of PtH$_{ads}$. The calculated ECSA for Pt@Sn and PtSn@Sn catalyst was 23.3 m$^2$g$^{-1}$ and 32.6 m$^2$g$^{-1}$, respectively.

The CV of formic acid oxidation on platinum based catalyst are shown in FIG. 5. Both catalysts showed similar onset potential (−0.15V) and peak current at same potential (0.76 V). Only forward sweeps of CV data are exhibited to show more clearly the electro-oxidation behavior of FA on both catalysts. The peak current was normalized with the amount of active metal. PtSn@Sn showed the highest current both in low and high potential region. Formic acid undergoes oxidation through indirect pathway on Pt based catalyst and peak current observed between 0.7 to 0.8 V. In case of PtSn@Sn a strong peak is observed at the low potential region resulting from the oxidation of FA through direct pathway that results from synergistic effect between Pt and Sn alloy. Without being bound by any particular theory, it is assumed that both pathways are structure sensitive and the reaction rate is strongly dependent on surface of electrode. On Pt (111) formic acid oxidizes through direct pathway, but the rate of reaction is very low; hence a small electro-oxidation current is observed. The rate of electro-oxidation is high on Pt (100) surface, but formic acid oxidizes through indirect pathway. High current density in high potential region also confirms better CO tolerance of PtSn@Sn as compared to Pt@Sn catalyst. The peak current density (at 0.76 V) for FA oxidation on Pt@Sn and PtSn@Sn was 200 mA/mg and 270 mA/mg, respectively. The total charge for formic acid oxidation, calculated by integrating the area under the curve in forward sweep for Pt@Sn and PtSn@Sn was 2.62*10$^{-3}$ C and 2.43*10$^{-2}$ C, respectively.

The cyclic voltammetry of electro-catalytic oxidation of methyl formate is presented in FIG. 6. The electro-oxidation of formic acid is dominant in low potential region, whereas electro-oxidation of methanol is the main reaction in high potential region. Without being bound by any particular theory, it is assumed that the complete electro-oxidation of methyl formate takes place according to the following reactions:

$$CH_3OCOH + H_2O \rightarrow HCOOH + CH_3OH \quad (1)$$

$$HCOOH \rightarrow CO_2 + 2H^+ + 2e^- \quad (2)$$

$$CH_3OH + H_2O \rightarrow CO_2 + 6H^+ + 6e^- \quad (3)$$

The onset potential for oxidation of methyl formate on Pt@Sn and PtSn@Sn is at −0.15 V and oxidation behavior was also similar in both low and high potential region. The current in case of PtSn@Sn catalyst was slightly higher than that of Pt@Sn. Formic acid is preferentially adsorbed and oxidized at low potentials and most of the current originates from its electro-oxidation. But, without being bound by any particular mechanism, in high potential region CO from methanol can significantly contribute to the majority of the observed current.

The difference in current density in low potential region for MF oxidation was not as prominent as for FA oxidation. But current density in both low and high potential region was slightly higher in case of PtSn@Sn catalyst. High current density measured with PtSn@Sn catalyst confirmed high activity and tolerance from CO poisoning. The peak current density (0.76 V) for MF oxidation on PtSn@Sn and Pt@Sn catalyst was 240 mA/mg and 190 mA/mg respectively. The total charge for formic acid oxidation, calculated by integrating the area under the curve in forward sweep for Pt@Sn and PtSn@Sn was $2.461*10^{-3}$ C and $1.997*10^{-2}$ C.

The cyclic voltagram of methanol oxidation on both catalysts is shown in FIG. 7. Platinum based catalysts oxidizes methanol and the onset potential for methanol oxidation on Pt@Sn and PtSn@Sn catalysts was at −0.15 V. In case of methanol electro-oxidation only one peak was observed at 0.78V. The maximum current at this potential was higher in case of PtSn catalyst. In all potential regions, the electro-oxidation current was also higher in case of PtSn catalyst. That might be because of high catalytic activity and easier oxidation of CO that is generated as intermediate during the process of the methanol oxidation on the tin supported catalysts. In addition to superior catalytic activity, both catalysts showed stability during the period of measurement. The peak current density for methanol oxidation on PtSn@Sn catalyst was slightly higher than FA acid and MF oxidation, but the total oxidation charge showed the trend FA>MF>MeOH. The total charge for methanol oxidation in forward sweep for Pt@Sn and PtSn@Sn was $2.996*10^{-3}$ C and $2.09*10^{-2}$ C, respectively.

Example 2

Pt Electroless Deposition Process

Without being bound by any particular theory, it is assumed that during the Pt electroless deposition process, $Pt^{2+}$ ions from the solution are directly reduced by the less noble Sn metal due to the difference in the standard reduction potentials of Sn and Pt, −0.14 and 1.2 V, respectively. The reduced Pt atoms precipitate on the electrode whereas $Sn^{2+}$ ions dissolve into the solution. This spontaneous process which occurs spontaneously without the need of adding another reducing agent.

FIGS. 8A-D present SEM micrographs of tin nano-particles electrodeposited on toray paper sheet, after immersion in the Pt electroless solution for different time spans. Acid as an additive is used to remove the oxide layer and to activate the Sn surface in order to allow reduction of $Pt^{2+}$ ions directly on the metallic substrate.

This approach provides lower electron transfer resistance compare to Pt deposed on $SnO_2$. During the electroless process, a thin Pt layer is formed on the tin particles as may be seen by the evolution of a dark layer which gradually covers the particles. The use of diluted acid additive results with leaching of tin and a decrease of the particle size until the Pt deposited particles forms a protective layer which prevents further degradation. After immersion for 5 min, the electrode remains stable even in standard 0.5 M solution and shows high reactivity towards methanol oxidation.

HRTEM images of the Sn electrodes were inspected during the electroless deposition process (FIGS. 9A-C). The original structure morphology of oxide layer seen in FIG. 9A is altered after one minute of immersion seen as surface roughening and local pitting. Longer immersion for 5 minutes (FIG. 9C) clearly displayed an extensive morphological change of the metallic Sn bulk together with formation of Pt grains seen as dark spots on the surface. Longer immersion spans did not change the catalyst layer structure and the Sn substrate morphology was retained.

Sn tends to form oxides such as SnO and $SnO_2$ when exposed to ambient air or in aqueous solution. These oxide layers may hinder the Pt electroless deposition process leading to formation of uninformed Pt layers, which decrease the Pt utilization and the electrode performance. To avoid this effect, the Pt electroless deposition was performed in several acid containing solutions which the Sn electrodes were immersed in for 5 minutes.

The Pt content of the electrodes was measured by ICP after a stable electrochemical performance was attained. FIG. 10 shows current vs. potential curves of methanol oxidation on the attained electrodes. It may be seen that the best performance is attained when the solution contained 0.05 M $H_2SO_4$ despite the somewhat lower Pt content in to this sample (63 μg/cm² compared with 70 μg/cm² and 85 μg/cm² for 0.025 M $H_2SO_4$ and 0.1 M $HClO_4$, respectively). This implies on the formation of a uniform Pt layer in this solution which leads to better utilization of the catalyst. It should be noted that at higher acid concentrations, Sn dissolution has a detrimental effect on the electrodes due to the support and active catalyst losses.

Next, electroless deposition of PtSn alloy on the Sn dendrite electrodes was studied. The undertaken approach exploit Pt—Sn complexes formed between $SnCl_2$ and $PtCl_4$. FIG. 11 shows UV-Vis spectra of $K_2PtCl_4/SnCl_2$ mixture in 80% ethylene glycol and 20% water in Pt to Sn molar ratio of 1 to 5, respectively. The later solvent ratio was optimized as the best composition for the electroless reduction of the Pt—Sn complexes. Any further increase in the water content leads to instantaneous precipitation of the solid products and lower Pt yield. In solution of 100% ethylene glycol no substantial electroless process was observed.

It should be noted that the Pt(II) to Sn(II) molar ratio of 1 to 5 was chosen in order to allow full substantiation of all the Cl ligands by $SnCl_3$ during the complexation reaction to form the stable $[Pt(SnCl_3)_5]$. The Pt UV-Vis spectrum in FIG. 11 shows a typical peak of $[PtCl_4]^{2-}$ at 248 nm, whereas a new peak appears at 300 nm and a broad wave up to 600 nm in the Pt—Sn spectrum, attributed to the formation of the Pt—Sn complexes, presumably $[Pt(SnCl_3)_x Cl_{5-x}]^{2-}$ (x=1-5).

ICP analysis of the PtSn alloy atomic composition was performed by electroless deposition on Pb electrodeposited electrodes which were immersed in identical 1:5 $K_2PtCl_4$/$SnCl_2$ solution. Pb was selected as the test substrate for two reasons—first—deposited tin cannot be distinguished from the bulk Sn substrate and secondly, the close standard reduction potential of $Pb^{2+}$ and $Sn^{2+}$: −0.1205 V and −0.1375 V, respectively, close enough to simulate similar reduction conditions. In these ICP measurements, Pt and Sn in molar ratio were 1 to 1.8.

Voltammetric study of Pt—Sn complexes reduction at early stages of electroplating on a gold working electrode shows that the onset potential of the electroplating process shifts to higher overpotential of −0.5 V compared with 0.4 V of $Pt^{2+}$ and −1.1 V of $Sn^{2+}$ reduction. These values are much more positive than the Sn and Pb reduction potentials, enabling the electroless deposition reaction of the formed complexes on those substrates. This also implies on the presence of the complex and its reduction potential which is higher than the Sn one.

Attempts to perform XRD measurements on Pt and PtSn electroless deposited on Sn dendritic electrodes was unsuccessful due to the low thickness of the noble metal layer. Hence, Sn powder with an average particle size of 10 μm was stirred in solution of 10 mM $K_2PtCl_4$ and 50 mM $SnCl_2$ for 24 h and characterized by XRD. Most of the peaks in the Pt pattern are assigned to the Sn substrate including the main peaks at 2θ values of 31.01° (200), 32.89° (101), 44.16° (220) and 45.15° (211). Only Pt (111) peak at 40.16° is seen in this pattern, due to the low loading of the Pt layer formed on the Sn particles surface area (FIG. 12). There was no evidence of Pt—Sn intermetallic bonds formed during the electroless process found in these measurements. However, in PtSn pattern, new peaks obtained at 2θ (2-theta) values of 15.78°, 21.71°, 42.51°, 66.88°, and 75.66°. A multiple overlapping peak in the 2-theta range of 33.50° to 37.50° were also observed. The exact assignment of the peaks to known stoichiometric compounds may include PtSn, $PtSn_2$ or $PtSn_4$.

Methanol Oxidation on Catalysts Prepared by Electroless Deposition:

The electroactivity of methanol oxidation on catalysts prepared by electroless deposition on Sn dendrite electrodes towards methanol oxidation was studied using Pt@Sn and PtSn@Sn electrodes. FIG. 13A shows the current vs. potential curves of Pt@Sn steady state voltammogram. Two electrodes that are shown were prepared by electroless process for 2.5 min (E1) and 5 min (E2), respectively. Interestingly, despite the different electroless process time span, the Pt loading on both electrodes was about 25 μg.

As shown above (FIGS. 8A-D and 12), during the electroless process which occurs in an acidic solution, the Sn substrate nano-structures were partially dissolved resulting with the loss of the active material until more homogeneous Pt layer is formed on the Sn nano-structures surface area. Electrochemical surface area calculated from the hydrogen desorption region for electrode E2 is 11.6 $m^2/g$ which is higher than 1.72 $m^2/g$ of electrode E1. Methanol oxidation follow the same trend showing higher CO oxidation peak of E2 over E1 (FIG. 13B), whereas the integrated oxidation charges are 200.0 mC and 50.2 mC, respectively. It seems that longer the electroless time spans, results with more uniform layers of Pt are formed, resulting in higher utilization of the Pt.

FIGS. 14A-B show the same measurements for electrodes E3 and E4 prepared in 10 mM $K_2PtCl_4$ and 50 mM $SnCl_2$ in ethylene glycol electroless solution, by 15 and 30 min immersion in the electroless solution, respectively. Longer time spans were needed to obtain substantial catalysts deposition due to the slower nature of the electroless reaction in the ethylene glycol solution. In this case, longer electroless reaction time span gave rise to lower ECSA values of 23.5 $m^2/g$ for the electrode prepared at long immersion time span of 30 min (E4) compared to 86.4 $m^2/g$ for the electrode prepared at short immersion time of 15 min (E3), although in both electrodes the Pt loading was about 50 μg/$cm^2$. This is also reflected by the integrated charge of CO oxidation on both electrodes, 875 mC and 510 mC for E4 and E3, respectively. In this case, longer immersion time spans of 30 min, results with the loss of some of the Sn substrate dissolved leaving lower surface area for the PtSn deposition which forms thicker catalyst layers with low electroactivity.

A comparison of Pt and PtSn catalysts undoubtedly show the 5-fold enhanced peak oxidation current of PtSn@Sn. This is attributed to co-catalysis effect of Sn on Pt that facilitates the catalysts electroactivity due to electronic effect as well as oxophilic bi-functional contribution from the $SnO_x$.

Taken together, it can be concluded that Pt@Sn and PtSn@Sn electrodes were synthesized by one step, binder free electroless deposition method. The active material forms a thin layer on the pre-electrodeposited Sn nano-structures. The acidity of the electroless solution must be carefully adjusted in order to remove some of the oxide layers covering the Sn substrate thus hindering the electroless process, without dissolving the Sn substrate to a large extent. PtSn species were detected on the Sn substrate which was immersed in Pt and Sn precursors solution by XRD measurements, due to the formation of Pt—Sn complexes which undergo reduction during the electroless process. The ECSA and the electrodes activity towards methanol oxidation is prone to the electroless process time span.

Shorter or longer immersion time in the electroless solution results with uniform active material deposition and low electroactivity. Fuel cell measurements of the attained electrodes showed the higher electroactivity of the electrolessly deposited Pt@Sn and PtSn@Sn electrodes over commercial PtRu electrodes in terms of higher peak power and potential, due to the unique structure of these electrodes as well as a synergistic effect of the Sn substrate on the electroactivity of the active metal. These encouraging results give rise to further development of catalysts deposited on metallic substrates as thin layers for the oxidation of methanol and other fuels, utilizing electroless deposition technique.

Example 3

Electro-Oxidation Testing

The Galvanic Method

The performance of a single cell using Pt@Sn and PtSn@Sn anode catalysts for electro-oxidation of methyl formate and formic acid was examined and compared with the commercial PtRu@C (E-TEK) anode. The single cell testing was performed in the temperature range of 30-70° C. Anode and cathode catalysts were activated by running the cell under hydrogen before changing the fuels. The flow rate of methanol was kept low to mitigate the problem of crossover. The performance of single cell has illustrated in FIGS. 15A-B and FIGS. 16A-B. The maximum power density delivered by fuel cell depends on the loading of catalyst. The power density both in terms of geometrical surface area and loading of catalyst was normalized. The maximum power density for formic acid oxidation on Pt@Sn and PtSn@Sn was 0.055 W/mg and 0.085 W/mg, respectively. The gravimetric power density of PtSn@Sn catalyst was 3 times higher than the same catalyst prepared by the polyol method. PtSn@Sn exhibited the highest power output for electro-oxidation all fuels.

The Pt@Sn anode catalyst also exhibited superior performance toward formic acid and methyl formate oxidation as compared to commercial PtRu catalyst. The maximum power density for methyl formate oxidation on PtSn@Sn and Pt@Sn catalyst was 0.60 W/mg and 0.45 mW/mg respectively. Moreover, the maximum power density for methanol oxidation is also higher than the commercial PtRu catalyst. The performance of Pt@Sn catalyst is comparatively lower than that of the PtSn@Sn but higher than that of the commercial PtRu catalyst.

Online FTIR Spectroscopic Study of Fuel Oxidation:

The main gaseous product of formic acid oxidation was $CO_2$. Increase in operating potential of cell $CO_2$ concentration gradually increases the gaseous product. The FTIR spectra of gaseous products are shown in FIGS. 17A-B.

At low potential (0.2V) characteristic peak for formic acid was observed at 1730 $cm^{-1}$ and 1250 $cm^{-1}$ that is derived from C=0 and C—O stretching, respectively. Formic acid oxidizes through dehydration and oxidation of adsorbed CO ($CO_{ad}$). Linearly and multiply bonded $CO_{ad}$ and bridge-bonded formate are the only detectable intermediates. These intermediates are also bounded to catalyst surface so are not detectable in gaseous product. The only detectable gaseous product is carbon dioxide and the characteristic peak was observed at 2350 $cm^{-1}$ that gradually increases with the increase in applied potential. Without being bound by any particular mechanism it is assumed that the intensity of formic acid peaks gradually decreases because of the fast kinetics of electro-oxidation and relative low volatility. The electro-oxidation pathway for formic acid on Pt is also potential dependent. The main gaseous product $CO_2$ was detected at all potentials that reveal electro-oxidation of formic acid through direct pathway. The electro-oxidation of formic acid through direct pathway is further confirmed by dominant peak in low potential region in the voltagram.

The peaks for MF were observed at all potentials because of the high volatility, but the peaks for methanol or formic acid were absent in FTIR spectra that confirm it was not hydrolysed in water in absence of acid. The NAFION® membrane was highly acidic and MF undergoes hydrolysis only when it reaches the membrane. The characteristics peak of methyl formate was observed at 1750 $cm^{-1}$, 1190 $cm^{-1}$ and 2900 $cm^{-1}$ that was derived from C=O, C—O and C—H stretching, respectively.

Similar to formic acid, the only detectable gaseous product was carbon dioxide and the characteristic peak was observed at 2350 $cm^{-1}$ that gradually increased with increase in applied potential. High volatility of methyl formate resulted in strong characteristic peak at all potential as compared to characteristics $CO_2$ peaks. The main poisoning intermediate CO is strongly adsorbed to the catalyst, and hence could not be observed in the gas phase FTIR spectrum. Beside strong peaks for MF and $CO_2$ peaks, no other peaks which could be attributed to partial oxidation products were observed in the spectrum which suggests either that the intermediates are consumed as fast they are formed or strongly adsorbed to the catalyst surface; hence no detectable gaseous product in the gas phase FTIR spectra.

It can be concluded that Pt@Sn and PtSn@Sn catalyst synthesized by electro-deposition and galvanic displacement reaction showed enhanced activity and stability toward formic acid and methyl formate electro-oxidation. The scanning electron microscopy and energy dispersive x-ray mapping showed uniform distribution of both catalysts on tin dendrites. A dominant peak in low potential region confirms electro-oxidation of formic acid through direct pathway. Fuel cell results also showed better performance as compared to commercial PtRu catalyst. The gravimetric power density in laboratory prototype fuel cell was 4 times higher than PtSn catalyst synthesized by the polyol method.

The Electroless Method

The electroactivity of the prepared electrodes was evaluated as fuel cell anodes in a laboratory fuel cell configuration. A 1 M methanol solution was supplied to the anode side (1 ml/min) while the humidified air (150 ml/min) at 70° C. Commercial PtRu spray coated electrode was measured in the same conditions as reference. The active metal loading of all anodes was 70-80 µg/$cm^2$. FIGS. 18A-B presents the potential and power vs. current density plots of the fuel cells at 70° C. under dynamic current load operation control. Pt@Sn and PtSn@Sn peak power values attained in these measurements were 19.0 mW/$cm^2$ and 35.7 mW/$cm^2$, respectively, far higher than the value attained in the case of reference PtRu electrode (9.5 mW/$cm^2$).

These relatively high power values are attributed to the unique core-shell structure of the Pt@Sn and PtSn@Sn materials comprised of thin layer of catalyst on the core Sn nano-structures.

Example 4

Electrocatalysts Comprising Palladium

Catalyst Synthesis by Electroless Process by Ethylene Glycol Assisted Reduction

In exemplary procedures, standard electrodes were prepared by electrodeposition of Sn from a solution of 18 mM $SnCl_2$/50 mM sodium citrate in water, on TORAY® TGPH-090 carbon paper (1 $cm^2$) to form 3D tree-shaped Sn high surface area nano-structures. The electrodes were then immersed in 10 mM water and ethylene glycol-water solutions of the catalysts precursors: $K_2PtCl_4$, $PdCl_2$, $SnCl_2$ and $RuCl_3$, of different compositions, for selected time spans. By applying this electroless process, a thin catalyst layer is formed on the Sn nano-trees. It is important to note that the electroless process was performed immediately after the electrodeposition process to minimize the Sn passivation in air.

Catalysts Characterization:

Electrodeposition and electrochemical measurements were performed using Biologic VSP multichannel potentiostate and CHInstruments 700 C and 760 C electrochemical workstations, in a three electrode electrochemical cell using Pt mash as counter electrode and Ag/AgCl reference electrode.

The electrodes active material content was measured by dissolving electrode coating in aqua regia solution and measuring it utilizing Varian 710-ES ICP system. XRD measurements were carried out using a PAnalytical X-ray diffractometer (X'Pert PRO). FTIR measurements were conducted using Bruker Vertex 70 spectrophotometer.

Results

Pd, PtSn, PdSn, PtRu and ternary PtPdRu and PtPdSn catalysts were synthesized on pre-electrodeposited Sn electrodes by electroless displacement method. The activity of the best selected catalysts (compared with Pt) towards MF oxidation is presented in FIG. 19.

The physical and chemical properties of the attained materials were explored. Firstly, the morphology and structure of the obtained catalysts were studied.

Without being bound by any particular theory, it is assumed that the exceptional electroactivity of the PtPdSn electrodes, shown in FIG. 19 is attributed to dual mechanism. According to this mechanism, methyl formate can undergo "direct oxidation" to CO at potentials as low as 50 mV, while the other path involves "indirect oxidation" of adsorbed CO at potentials higher than 0.7 V.

Finding that these reactions can co-exist on Pd while Pt facilitates only the indirect path. Therefore, it was decided to further investigate and optimize these electrodes incorporating the high activity of Pd at low potentials (direct oxidation path) and that of Pt at high potentials region (indirect oxidation path). PtPd and PtPdSn catalysts were synthesized and tested in MF and dimethyl ether (DME), solutions.

FIG. 20 shows XRD patterns of PtPd and PtPdSn catalysts prepared by electroless deposition on Sn particles. Except of main Sn peaks at 2θ values of 31.01° (200), 32.89° (101), 44.16° (220) and 45.15° (211), and the main Pt peaks at new peaks at 15.78°, 21.71°, 42.51°, 66.88°, and 75.66° are assigned to Pt—Sn phases. A broad wave above 30° may indicate on the formation of Pt—Pd phases.

In order to study the effect of Pt—Pd alloying on the electroactivity of the catalysts towards MF and DME oxidation, PtPd/Sn catalysts with different Pt to Pd stoichiometric ratio were synthesized and evaluated electrochemically. Since methanol and formic acid (FA) are intermediates in the indirect oxidation path of MF (see FIG. 19), a complementary analysis of the reactivity of these catalysts was also done in formic acid (FA) and methanol (MeOH) solutions. The electrochemical parameters compiled from these measurements are presented in Table 2 below.

FIGS. 21A-D show cyclic voltammetric curves of DME, MF, FA and MeOH fuels oxidation on selected catalysts electrodes. These results are normalized to the weight of the total active noble metal (Pt+Pd) for comparison. For clarification, the given Pt to Pd ratios mentioned in these curves corresponds to the ratios of the precursors used in the synthesis, whereas the actual atomic ratio on measured by ICP were 0.8:1, 0.52:1 and 0.85:1, for the 1:1, 2:3 and 3:2, respectively. Although the 1:1 and 3:2 (Pt to Pd ratio in precursors) electrodes have almost the same atomic ratio, the electroactivity of the later electrode is far more active (156.7 and 1061 mC/mg active novel metal, respectively, for MF oxidation). This may be attributed to the formation of different phases with different active sites in each synthesis. It is assumed that the synergistic effect between Pt and Pd leads to an enhanced electroactivity compared to Pt electrodes (see FIG. 19) or the new phase identified in the XRD is promoting the reactions. Sn alloyed with Pt or Pd enhances the electroactivity of the catalyst toward MF, FA and MeOH oxidation. PtPdSn@Sn electrodes were prepared by controlling the immersion time spans of the Sn electrode in the Pt and Pd salt solution. Electrochemical measurements of these electrodes in MF, FA, MeOH and DME performed by CV are shown in FIGS. 22A-D and are listed in Table 2 further showing the measured electrochemical parameters of catalysts in study in different fuel solutions (ECSA, Ei—Onset Potential, Ep—Peak Potential, Ap—Integrated oxidation charge).

TABLE 2

| Electrode Type | ECSA m²/g | Methanol | | | | Methyl Formate | | |
|---|---|---|---|---|---|---|---|---|
| | | $E_i$, V | $E_i$, V | $E_p$, V | $A_p$, mC/mg | $E_p$, V | $A_p$, mC/mg | |
| PtPd 1:1 | 16.87 | 0.075 | 0.035 | 0.325/0.72 | 156.7 | 0.068 | 167.3 | |
| PtPd 1:4 | 15.98 | 0.100 | 0.042 | 0.372/0.741 | 226.9 | 0.700 | 54.6 | |
| PtPd 2:3 | 47.09 | 0.125 | 0.037 | 0.347/0.77 | 1127 | 0.714 | 1030 | |
| Ptpd 3:2 | 23.25 | 0.100 | 0.035 | 0.352/0.75 | 1061 | 0.695 | 812.9 | |
| PtPdSn 10 min | 32.51 | 0.095 | 0.045 | 0.325/0.74 | 396.8 | 0.688 | 356.7 | |
| PtPdSn 15 min | 43.68 | 0.100 | 0.000 | 0.460/0.875 | 2228 | 0.805 | 1201 | |
| PtPdSn 30 min | 14.04 | 0.128 | 0.022 | 0.380/0.738 | 996 | 0.675 | 477.4 | |

| Formic Acid | | | Dimethyl Ether | | |
|---|---|---|---|---|---|
| $E_i$, V | $E_p$, V | $A_p$, mC/mg | $E_i$, V | $E_p$, V | $A_p$, mC/mg |
| 0.0 | 0.325/0.742 | 287.2 | | | |
| 0.02 | 0.330/0.740 | 230.2 | | | |
| 0.045 | 0.307/0.756 | 625 | | | |
| 0.015 | 0.361/0.745 | 1190 | | | |
| 0.020 | 0.320/0.730 | 586.5 | 0.112 | 0.440/0.652 | 330.4 |
| −0.04 | 0.460/0.890 | 2571 | 0.100 | 0.440/0.725 | 425.1 |
| 0.03 | 0.340/0.722 | 587.7 | 0.075 | 0.375/0.772 | 287.7 |

As demonstrated, regarding the effect of the exposure time on Pt and PtSn catalysts, shorter time spans of immersion result in incomplete coverage process and catalyst layer, whereas too long time lead to enhanced corrosion seen as loss of material as well as formation of thick catalyst layer of lower utilization. In the case of PtPdSn, 15 minutes process was found to be the optimum immersion time span to yield the most active electrodes (2228 mC/mg catalyst vs. 397 and 996 mC/mg at 10 and 30 minutes, respectively, for MF oxidation).

Regarding the DME oxidation, it should be noted that the electroactivity of the PtPdSn/Sn catalysts is far higher than that of Pt electrodes (425 and 288 mC/mg for 15 and 30 minutes PtPdSn electrodes vs. 46 mC/mg for Pt), and is maintained through tens of cyclic voltammetry cycles.

Within the scope of this disclosure, it is a critical to identify the oxidation products formed at each potential. This approach may allow the development of new ways of analyzing the oxidation mechanism of DME and MF on the disclosed catalysts, by monitoring the formation of intermediates and products during the oxidation process.

Catalyst Synthesis by Ethylene Glycol Assisted Reduction without Support

In additional exemplary procedures, an appropriate amount of tetrachloroplatinate, palladium chloride and tin chloride was dissolved in ethylene glycol by sonication. The pH of solution was adjusted to 12 by slowly adding NaOH dissolved in ethylene glycol. The resultant dark brown solution was heated in oil bath at 80° C. for one hour and then the temperature increased to 180° C. and the solution was kept at this temperature for 4 hours. Hydrochloric acid was added to neutralize the solution and the precipitate was washed several times with acetone and water. Finally, the catalyst was dried under vacuum at 80° C. for 4 hours. 1 mg of the catalyst was dissolved in freshly prepared aqua regia ($H_2SO_4$, HCl) and molar ratios of elements were determined by Inductive Coupled Plasma Atomic Emission Spectroscopy (ICP-OES), as presented in Table 3.

TABLE 3

| Sample No. | Catalyst | Precursor composition | Final composition |
|---|---|---|---|
| 1. | $(PtPd)_3Sn$ (3:3:2) | 3:3:2 | 3:3:2 |
| 2. | $(PtPd)_3Sn$ (1:2:1) | 1:2:1 | 1:2:1 |
| 3. | $(PtPd)_3Sn$ (2:1:1) | 2:1:2 | 2:1:2 |

Catalyst Synthesis by Galvanic Displacement (Supported on Sn)

In additional exemplary procedures, PtPd@Sn and PtPdSn@Sn catalysts were prepared by galvanic replacement of active metals on electrodeposited tin dendrites and commercial tin nanoparticles. Electro-deposition of tin was performed on TORAY® carbon paper (1 cm²). The solution for electro-deposition was prepared by dissolving tri-sodium citrate (0.05M) and tin chloride (0.018M) in deionized water. Tin chloride solution (25 ml) was purged with nitrogen and electro-deposition was performed by applying constant potential of −3.0 V and total charge of 10 Coulombs.

After tin deposition, the electrodes were washed with deionized water and acetone and were dried under nitrogen. The precursor solution for galvanic displacement of PtPd, and PtPdSn was prepared by dissolving the relevant active metal salts in appropriate ration in ethylene glycol and water at 4:1 (V:V) ratio containing 50 mM of $H_2SO_4$. The solution was purged with nitrogen before electroless deposition. The attained catalysts were washed with deionized water, then with acetone and dried under nitrogen. After electrochemical testing all of the electrodes were dissolved in aqua-media and diluted 100 times in deionized water for ICP-OES analysis.

Catalyst Preparation by Galvanic Replacement on Commercial Tin Nanoparticle

In additional exemplary procedures, commercial tin nanoparticles were treated with hydrofluoric acid (1.0M) to remove the oxide layer before galvanic replacement. The solution for galvanic replacement of Pt, PtPd, and PtPdSn was prepared by dissolving corresponding active metal salts (5 mM) and $SnCl_2$ (50 mM) in ethylene glycol and water at 4:1 (V:V) ratio containing 50 mM of hydrofluoric acid. The resultant catalyst was washed and dried as mentioned above.

Electrochemical Testing

Electrochemical testing was performed in three electrode cells in which Pt mesh counter electrode and Ag/AgCl (3M KCl) reference electrode was used. 5 mg of catalyst (PtPdSn) and 20 uL of NAFION® (5% in ethanol) were dispersed in 0.5 ml isopropyl alcohol and 0.5 ml water. 40 ul of catalyst ink was coated on 1 cm² TORAY® Carbon Sheet. All the electrochemical measurements were performed in 0.5 M sulfuric acid saturated with DME (0.76 M) at room temperature, as summarized in Table 4.

TABLE 4

| Sample No | Catalyst | Support | $I_p$ | $E_p$ | Pt:Pd |
|---|---|---|---|---|---|
| 1. | PtPdSn | Sn Dendrites | 150 mA/mg | 0.75 V | 1.2:1 |
| 2. | PtPdSn | Sn Dendrites | 90 mA/mg | 0.70 V | 0.68:1 |
| 3. | PtPdSn | Sn Dendrites | 120 mA/mg | 0.70 V | 0.98:1 |
| 4. | PtPd | Sn Dendrites | 25 mA/mg | 0.60 V | 1:1 |
| 5. | PtPd | Sn Dendrites | 25 mA/mg | 0.60 V | 1:1 |
| 6. | PtPd | $SnO_2$ | 25 mA/mg | 0.65 V | 1:1 |
| 7. | $(PtPd)_3Sn$ | Unsupported | 90 mA/mg | 0.60 V | 1:1 |
| 8. | PtSn | Unsupported | 150 mA/mg | 0.70 V | PtSn (1:1) |
| 9. | Pt | Commercial Tin NPs | 110 mA/mg | 0.70 V | PtSn (4:1) |

Fabrication of Membrane Electrode Assembly for Fuel Cell

In additional exemplary procedures, anode catalyst ink (e.g., PtPdSn 3:3:2) was prepared by dispersing catalyst in water with appropriate amount of Carbon Black and NAFION®. Similarly, cathode catalyst ink was prepared by dispersing Pt black (JOHNSON MATTHEY™), carbon black (VULCAN™ XC72™), NAFION® and TEFLON® in appropriate amount of water. The catalyst ink was directly spray coated on membrane (the NAFION® 212) and dried under vacuum at 60° C. Catalyst coated membrane (MEA—membrane electrode assembly) was soaked overnight in water to hydrate and laboratory prototype single cell was assembled using TORAY® carbon as support on anode side and carbon cloth on cathode side. The catalyst loading on anode and cathode was 1.2 mg/cm$^2$ and 3.5 mg/cm$^2$, respectively.

The electrodes were activated by flowing hydrogen on anode side and humidified nitrogen on the cathode side. Both DME and compressed air was passed through humidity bottle at a given temperature and directly supplied as a gas. The DME and air flow rate was 40 ml/min and 400 ml/min respectively.

Example 5

Electrocatalysts Comprising Lead Support

An example of methanol oxidation on Pt@Pb is shown in FIG. 23 presenting cyclic voltammetry of Pt@Pb in $H_2SO_4$ and methanol.

It can be concluded that such lead support catalysts are active in the oxidation of other fuels mentioned hereinthroughout.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition comprising:
   a film deposited on at least one surface of a substrate and said film is coated by a shell, wherein:
   said shell has a thickness of less than 50 nm and comprises one or more noble metal nanoparticles (NPs);
   said film consists of a metal selected from the group consisting of: tin (Sn), lead (Pb), antimony (Sb) or a combination thereof, wherein said metal is in an elemental state within said composition; and wherein said film is in the form of a dendritic structure having a stem and branches.

2. The composition of claim 1, wherein said composition is in a form of an electrocatalyst configured for oxidation of a fuel.

3. The composition of claim 1, wherein said film is coated by said noble metal nanoparticles via electroless plating so as to form said shell on said film.

4. The composition of claim 1, wherein said substrate is a material selected from carbon, a metal oxide, a polymer, or any combination thereof.

5. The composition of claim 1, wherein the stem and branches of said dendritic structure are characterized by a ratio of 1:1 to 5:1, respectively.

6. The composition of claim 1, wherein a median size of said noble metal nanoparticles is from 1 to 10 nanometers.

7. The composition of claim 1, wherein said one or more noble metal NPs further comprise a metal selected from the group consisting of: Sn, ruthenium (Ru), selenium (Se), or any combination thereof.

8. The composition of claim 1, wherein the thickness of said shell is less than 10 nm, and wherein said fuel is selected from the group consisting of methanol, ethanol, formic acid, formaldehyde, dimethyl ether, methyl formate, and glucose.

9. The composition of claim 1, wherein said noble metal is selected from the group consisting of: platinum (Pt), palladium (Pd), or a combination thereof.

10. The composition of claim 9, wherein said Pt, and Pd are in a molar ratio of from 3:1 to 1:3, respectively.

11. A fuel cell having an electrocatalyst comprising the composition of claim 1.

12. The fuel cell of claim 11, wherein said electrocatalyst is anode.

13. The fuel cell of claim 11, wherein said electrocatalyst is characterized by an electrochemically active surface area of at least 75 $m^2g^{-1}$.

14. A process for manufacturing the composition of claim 1, wherein:
   the process comprising the steps of:
   (i) electrodepositing said film on said substrate; and
   (ii) plating a material comprising said noble metal NPs on said film, thereby obtaining said composition.

15. The process of claim 14, wherein step (ii) is performed by electroplating or electroless plating.

16. The process of claim 14, wherein step (ii) further comprises plating an element on said film; wherein said element is selected from the group consisting of: Sn, ruthenium (Ru), selenium (Se), or any combination thereof; optionally wherein said element is Sn.

* * * * *